US009910297B1

(12) United States Patent
McCabe et al.

(10) Patent No.: US 9,910,297 B1
(45) Date of Patent: *Mar. 6, 2018

(54) EYEWEAR WITH CHROMA ENHANCEMENT

(71) Applicant: Oakley, Inc., Foothill Ranch, CA (US)

(72) Inventors: Brock Scott McCabe, Laguna Niguel, CA (US); Ryan Saylor, Mission Viejo, CA (US); Carlos D Reyes, Rancho Santa Margarita, CA (US); Colin Boyles, Irvine, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,137

(22) Filed: Feb. 17, 2017

Related U.S. Application Data

(63) Continuation of application No. 14/593,844, filed on Jan. 9, 2015, now Pat. No. 9,575,335.

(60) Provisional application No. 61/926,228, filed on Jan. 10, 2014.

(51) Int. Cl.
*G02C 3/00* (2006.01)
*G02C 7/10* (2006.01)

(52) U.S. Cl.
CPC ............. *G02C 7/104* (2013.01); *G02C 7/108* (2013.01); *G02C 2202/16* (2013.01)

(58) Field of Classification Search
CPC ............ G02C 7/10; G02C 7/12; G02C 7/104; G02C 7/02
USPC .............. 351/159.49, 159.59, 159.6, 159.63, 351/159.64, 159.65, 159.73
See application file for complete search history.

(56) References Cited

U.S. PATENT DOCUMENTS

| 2,219,122 | A | 10/1940 | Weidert et al. |
| 3,701,590 | A | 10/1972 | Zeltzer |
| 3,877,797 | A | 4/1975 | Thornton, Jr. |
| 4,176,299 | A | 11/1979 | Thornton, Jr. |
| 4,288,250 | A | 9/1981 | Yamashita |
| 4,300,819 | A | 11/1981 | Taylor |
| 4,354,739 | A | 10/1982 | Scanlon et al. |

(Continued)

FOREIGN PATENT DOCUMENTS

| CN | 1338622 | 3/2002 |
| CN | 2859575 | 1/2007 |

(Continued)

OTHER PUBLICATIONS

"ANSI Z80.3-2010 American National Standard for Opthalmics-Nonprescription Sunglass and Fashion Eyewear Requirements," Jun. 7, 2010, pp. 1-25.

(Continued)

*Primary Examiner* — James Greece
(74) *Attorney, Agent, or Firm* — Sterne, Kessler, Goldstein & Fox P.L.L.C.

(57) ABSTRACT

Some embodiments provide a lens including a lens body and an optical filter configured to attenuate visible light in certain spectral bands. At least some of the spectral bands can include spectral features that tend to substantially increase the colorfulness, clarity, and/or vividness of a scene. In certain embodiments, eyewear incorporates an optical filter that enhances chroma within one or more spectral bands. In some embodiments, a wearer of the eyewear can perceive the increase in chroma when viewing at least certain types of scenes.

20 Claims, 8 Drawing Sheets

(56) References Cited

U.S. PATENT DOCUMENTS

| | | |
|---|---|---|
| 4,376,829 A | 3/1983 | Daiku |
| 4,405,881 A | 9/1983 | Kobayashi |
| 4,521,524 A | 6/1985 | Yamashita |
| 4,659,178 A | 4/1987 | Kyogoku |
| 4,663,562 A | 5/1987 | Miller et al. |
| 4,687,926 A | 8/1987 | Plummer |
| 4,769,347 A | 9/1988 | Cook et al. |
| 4,802,755 A | 2/1989 | Hensler |
| 4,826,286 A | 5/1989 | Thornton, Jr. |
| 4,838,673 A | 6/1989 | Richards et al. |
| 4,998,817 A | 3/1991 | Zeltzer |
| 5,039,631 A | 8/1991 | Krashkevich et al. |
| RE33,729 E | 10/1991 | Perilloux |
| 5,054,902 A | 10/1991 | King |
| 5,061,659 A | 10/1991 | Ciolek et al. |
| 5,077,240 A | 12/1991 | Hayden et al. |
| 5,121,030 A | 6/1992 | Schott |
| 5,121,239 A | 6/1992 | Post |
| 5,149,183 A | 9/1992 | Perrott et al. |
| 5,164,858 A | 11/1992 | Aguilera, Jr. et al. |
| 5,190,896 A | 3/1993 | Pucilowski et al. |
| 5,218,386 A | 6/1993 | Levien |
| 5,408,278 A | 4/1995 | Christman |
| 5,438,024 A | 8/1995 | Bolton et al. |
| 5,446,007 A | 8/1995 | Krashkevich et al. |
| 5,574,517 A | 11/1996 | Pang et al. |
| 5,592,245 A | 1/1997 | Moore et al. |
| 5,646,479 A | 7/1997 | Troxell |
| 5,646,781 A | 7/1997 | Johnson, Jr. |
| 5,694,240 A | 12/1997 | Sternbergh |
| 5,715,031 A | 2/1998 | Roffman et al. |
| 5,729,323 A | 3/1998 | Arden et al. |
| 5,731,898 A | 3/1998 | Orzi et al. |
| 5,774,202 A | 6/1998 | Abraham et al. |
| 5,922,246 A | 7/1999 | Matsushita et al. |
| 5,925,468 A | 7/1999 | Stewart |
| 6,045,224 A | 4/2000 | Kallenbach et al. |
| 6,132,044 A | 10/2000 | Sternbergh |
| 6,135,595 A | 10/2000 | Takeshita et al. |
| 6,138,286 A | 10/2000 | Robrahn et al. |
| 6,142,626 A | 11/2000 | Lu et al. |
| 6,145,984 A | 11/2000 | Farwig |
| 6,175,450 B1 | 1/2001 | Andreani et al. |
| 6,313,577 B1 | 11/2001 | Kunisada et al. |
| 6,334,680 B1 | 1/2002 | Larson |
| 6,382,788 B1 | 5/2002 | Stehager |
| 6,391,810 B1 | 5/2002 | Lenhart |
| 6,450,652 B1 | 6/2002 | Karpen |
| 6,416,867 B1 | 7/2002 | Karpen |
| 6,420,290 B1 | 7/2002 | Brocheton et al. |
| 6,460,994 B1 | 10/2002 | Nolan |
| 6,604,824 B2 | 8/2003 | Larson |
| 6,631,987 B2 | 10/2003 | Reichow et al. |
| 6,641,261 B2 | 11/2003 | Wang et al. |
| RE38,402 E | 1/2004 | Stephens et al. |
| 6,677,260 B2 | 1/2004 | Crane et al. |
| 6,770,692 B1 | 8/2004 | Kobayashi et al. |
| 6,773,816 B2 | 8/2004 | Tsutsumi |
| 6,811,258 B1 | 11/2004 | Grant |
| 6,811,727 B2 | 11/2004 | Havens et al. |
| 6,852,657 B2 | 2/2005 | Kolberg et al. |
| 6,854,844 B2 | 2/2005 | Kroll et al. |
| 6,863,397 B2 | 3/2005 | Nakano |
| 6,893,127 B2 | 5/2005 | Reichow et al. |
| 6,926,405 B2 | 8/2005 | Ambler et al. |
| 6,932,472 B2 | 8/2005 | Marason et al. |
| 6,955,430 B2 | 10/2005 | Pratt |
| 6,979,083 B2 | 12/2005 | Kerns, Jr. et al. |
| 6,984,038 B2 | 1/2006 | Ishak |
| 7,029,118 B2 | 4/2006 | Ishak |
| 7,035,010 B2 | 4/2006 | Iori et al. |
| 7,106,509 B2 | 9/2006 | Sharp |
| 7,255,435 B2 | 8/2007 | Pratt |
| 7,256,921 B2 | 8/2007 | Kumar et al. |
| 7,276,544 B2 | 10/2007 | Lai et al. |
| 7,278,737 B2 | 10/2007 | Mainster et al. |
| 7,349,138 B2 | 3/2008 | Kumar et al. |
| 7,372,640 B2 | 5/2008 | Fung |
| 7,393,100 B2 | 7/2008 | Mertz |
| 7,506,976 B2 | 3/2009 | Baiocchi et al. |
| 7,506,977 B1 | 3/2009 | Aiiso |
| 7,520,608 B2 * | 4/2009 | Ishak .................... G02C 7/104 351/159.65 |
| 7,556,376 B2 * | 7/2009 | Ishak .................... G02C 7/104 351/159.01 |
| 7,597,441 B1 | 10/2009 | Farwig |
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,901,074 B2 | 3/2011 | Yamamoto et al. |
| 7,922,324 B2 | 4/2011 | Ishibashi et al. |
| 8,210,678 B1 | 7/2012 | Farwig |
| 8,733,929 B2 | 5/2014 | Chiou et al. |
| 8,770,749 B2 | 7/2014 | McCabe et al. |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 9,575,335 B1 | 2/2017 | McCabe et al. |
| 2001/0005281 A1 | 6/2001 | Yu |
| 2003/0020988 A1 | 1/2003 | Stone |
| 2003/0076474 A1 | 4/2003 | Wang et al. |
| 2004/0005482 A1 | 1/2004 | Kobayashi et al. |
| 2004/0246437 A1 | 12/2004 | Ambler et al. |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0201585 A1 | 9/2005 | Jannard et al. |
| 2005/0224703 A1 | 10/2005 | Harada et al. |
| 2006/0033851 A1 | 2/2006 | Iori et al. |
| 2006/0146275 A1 | 7/2006 | Mertz |
| 2006/0158881 A1 | 7/2006 | Dowling |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0236809 A1 | 10/2007 | Lippey et al. |
| 2008/0068555 A1 | 3/2008 | Lau et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2009/0040564 A1 | 2/2009 | Granger |
| 2009/0268102 A1 | 10/2009 | Barazza |
| 2010/0054632 A1 | 3/2010 | McCormick et al. |
| 2010/0066974 A1 | 3/2010 | Croft et al. |
| 2010/0073765 A1 | 3/2010 | Brocheton |
| 2010/0232003 A1 | 9/2010 | Baldy et al. |
| 2010/0283956 A1 | 11/2010 | Jackson et al. |
| 2011/0043902 A1 | 2/2011 | Ishibashi et al. |
| 2012/0044560 A9 | 2/2012 | Lam et al. |
| 2012/0236249 A1 | 9/2012 | Miwa et al. |
| 2014/0233105 A1 | 8/2014 | Schmeder |
| 2015/0022777 A1 | 1/2015 | McCabe et al. |
| 2016/0041408 A1 | 2/2016 | Carlson et al. |
| 2016/0048037 A1 | 2/2016 | McCabe et al. |
| 2016/0070119 A1 | 3/2016 | McCabe et al. |
| 2017/0068113 A1 | 3/2017 | McCabe et al. |
| 2017/0075143 A1 | 3/2017 | Saylor et al. |
| 2017/0205639 A1 | 7/2017 | McCabe et al. |

FOREIGN PATENT DOCUMENTS

| | | |
|---|---|---|
| CN | 101772723 | 7/2010 |
| CN | 102124394 | 7/2011 |
| DE | 3534575 | 4/1986 |
| EP | 0 127 821 | 12/1984 |
| EP | 0 519 660 | 12/1992 |
| EP | 1 986 024 | 10/2008 |
| FR | 2812629 | 2/2002 |
| GB | 1154500 | 6/1969 |
| JP | S63-008703 | 1/1988 |
| JP | H05-202109 | 8/1993 |
| JP | 2001-506012 | 5/2001 |
| JP | 2007-025609 | 2/2007 |
| JP | 2010-204383 | 9/2010 |
| WO | WO 88/002871 | 4/1988 |

(56) References Cited

FOREIGN PATENT DOCUMENTS

| | | |
|---|---|---|
| WO | WO 97/035215 | 9/1997 |
| WO | WO 99/067681 | 12/1999 |
| WO | WO 02/014930 | 2/2002 |
| WO | WO 2008/014225 | 1/2008 |
| WO | WO 2009/011439 | 1/2009 |
| WO | WO 2009/152381 | 12/2009 |
| WO | WO 2011/068051 | 6/2011 |
| WO | WO 2011/127015 | 10/2011 |
| WO | WO 2011/130314 | 10/2011 |
| WO | WO 2012/119158 | 9/2012 |
| WO | WO 2013/054656 | 4/2013 |
| WO | WO 2013/070417 | 5/2013 |
| WO | WO 2013/074269 | 5/2013 |
| WO | WO 2014/055513 | 4/2014 |
| WO | WO 2015/179538 | 11/2015 |
| WO | WO 2016/077431 | 5/2016 |

OTHER PUBLICATIONS

British Standard, "Personal Eye-Equipment—Sunglasses and Sunglare Filters for General Use and Filters for Direct Observation of the Sun," Technical Committee CEN/TC 85, Sep. 2007, pp. 46.
Drum, Bruce, "FDA Regulation of Labeling and Promotional Claims in Therapeutic Color Vision Devices: A Tutorial," Visual Neuroscience, May 2004, vol. 21, No. 3, pp. 461-463.
Encyclopedia of Polymer Science and Technology—Plastics, Resins, Rubbers, Fibers, edited by Mark, H. et al, vol. 9, John Wiley & Sons, 1968, USAA, pp. 6.
Golz et al., "Colorimetry for CRT displays," Journal of the Optical Society of America A, vol. 20, No. 5, May 2003, pp. 769-781.
Kirkpatrick et al., "Optimization by Simulated Annealing," Science, New Series, May 13, 1983, vol. 220, No. 4598, pp. 671-680.
Linear Programming, Feb. 28, 2011, http://en.wikipedia.org/w/index.php?title=Linear_programmming&oldid=416428507, pp. 14.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Nakamura et al, "Diffusion Coefficients of Disperse Dye to PE and PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.
"Product Description: Lagoon Sunglasses", Maui Jim website, printed on Feb. 18, 2014, web address: http://www.mauijim.com/lagoon.html, page was publicly available at least as early as Nov. 2009.
Rea et al., "Color Rendering: Beyond Pride and Prejudice," Color Research & Application, Dec. 2010, vol. 35, No. 6, pp. 401-409.

Sharp et al., "Retarder Stack Technology for Color Manipulation," SID Symposium Digest of Technical Papers, May 1999, vol. 30, No. 1, pp. 1072-1075.
Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, Mar. 1998, vol. 265, pp. 351-358.
International Search Report and Written Opinion dated Aug. 22, 2011 in PCT Application No. US/2011/32172.
International Preliminary Report on Patentability and Written Opinion dated Oct. 16, 2012 in PCT Application No. US/2011/32172.
International Search Report and Written Opinion dated Feb. 5, 2013, in PCT Application No. PCT/US2012/061060.
International Preliminary Report on Patentability and Written Opinion dated Apr. 22, 2014, in PCT Application No. PCT/US2012/061060.
International Search Report and Written Opinion dated Sep. 16, 2013, in PCT Application No. PCT/US2013/040284.
International Preliminary Report on Patentability and Written Opinion dated Nov. 20, 2014, in PCT/US2013/040284.
International Search Report and Written Opinion dated May 2, 2016 in PCT Application No. PCT/US2015/060103
International Search Report and Written Opinion dated Jun. 1, 2016, in PCT Application No. PCT/US2015/065311
International Search Report and Written Opinion dated Jan. 13, 2016, in PCT Application No. PCT/US2015/053206
International Search Report and Written Opinion dated Jul. 27, 2012, in PCT Application No. PCT/US2012/027790.
International Preliminary Report on Patentability and Written Opinion dated Sep. 3, 2013, in PCT/US2012/027790.
Exciton, "Product List", as archived Aug. 28, 2010 on archive.org in 2 pages.
International Preliminary Report on Patentability and Written Opinion dated May 26, 2017, in PCT Application No. PCT/US2015/060103.
Maui Jim, "All Sunglasses", as archived Mar. 30, 2009 on archive.org in 2 pages.
X-Rite, "A Guide to Understanding Color Communication", Mar. 2007, pp. 1-26, available at http://www.xrite.com/-/media/xrite/files/whitepaper_pdfs/l10-001_a_guide_to_understanding_color_communication/l10-001_understand_color_en.pdf.

* cited by examiner

EYEWEAR WITH CHROMA ENHANCEMENT

INCORPORATION BY REFERENCE OF RELATED APPLICATIONS

This application is a continuation of U.S. patent application Ser. No. 14/593,844, filed Jan. 9, 2015 and claims the benefit of priority under 35 USC § 119 of U.S. Provisional Patent Application No. 61/926,228, filed Jan. 10, 2014, titled EYEWEAR WITH CHROMA ENHANCEMENT FOR SPECIFIC ACTIVITIES. The entire contents of the above referenced applications are incorporated by reference herein and made part of this specification.

BACKGROUND

Field

This disclosure relates generally to eyewear and to lenses used in eyewear.

Description of Related Art

Eyewear can include optical elements that attenuate light in one or more wavelength bands. For example, sunglasses typically include a lens that absorbs a significant portion of light in the visible spectrum. A sunglass lens can have a dark film or coating that strongly absorbs visible light, thereby significantly decreasing the luminous transmittance of the lens. A lens can also be designed to have a spectral profile for another purpose, such as, for example, for indoor use, for use in sporting activities, for another particular use, or for a combination of uses.

SUMMARY

Example embodiments described herein have several features, no single one of which is indispensible or solely responsible for their desirable attributes. Without limiting the scope of the claims, some of the advantageous features will now be summarized.

Some embodiments provide a lens including a lens body and an optical filter within and/or outside of the lens body configured to attenuate visible light in a plurality of spectral bands. In some embodiments in which the optical filter is within the lens body, the optical filter can constitute the lens body, or the optical filter and additional components can constitute the lens body. The optical filter can be configured to substantially increase the colorfulness, clarity, and/or vividness of a scene. The optical filter can be particularly suited for use with eyewear and can allow the wearer of the eyewear to view a scene in high definition color (HD color). Each of the plurality of spectral bands can include an absorbance peak with a spectral bandwidth, a maximum absorbance, and an integrated absorptance peak area within the spectral bandwidth. The spectral bandwidth can be defined as the full width of the absorbance peak at 50% of the maximum absorbance of the absorbance peak, the full width of the absorbance peak at 80% of the maximum absorbance of the absorbance peak, the full width of the absorbance peak at 90% of the maximum absorbance of the absorbance peak, or the full width of the absorbance peak at 95% of the maximum absorbance of the absorbance peak. Many other suitable definitions are possible. In some embodiments, an attenuation factor obtained by dividing the integrated absorptance peak area within the spectral bandwidth by the spectral bandwidth of the absorbance peak can be greater than or equal to about 0.8 for the absorbance peak in at least some of the plurality of spectral bands. In some embodiments, the spectral bandwidth of the absorbance peak in each of the plurality of spectral bands can be greater than or equal to about 5 nm and less than or equal to about 50 nm.

In certain embodiments, the optical filter is at least partially incorporated into the lens body. The lens body can be impregnated with, loaded with, or otherwise comprise one or more organic dyes. Each of the one or more organic dyes can be configured to produce the absorbance peak in one of the plurality of spectral bands. In some embodiments, the optical filter is at least partially incorporated into a lens coating disposed over the lens body. For example, one or more of the organic dyes can include an absorbance profile having a blue light absorbance peak with a center wavelength and/or peak location between about 470 nm and about 490 nm. In some embodiments, the spectral bandwidth of the blue light absorbance peak can be greater than or equal to about 20 nm, and the attenuation factor of the blue light absorbance peak can be greater than or equal to about 0.8.

One or more of the plurality of organic dyes can include an absorbance profile having a yellow light or yellow-green light absorbance peak with a center wavelength and/or peak location between about 560 nm and about 580 nm. In some embodiments, the spectral bandwidth of the yellow light or yellow-green light absorbance peak can be greater than or equal to about 20 nm, and the attenuation factor of the yellow light or yellow-green light absorbance peak can be greater than or equal to about 0.8.

One or more of the plurality of organic dyes can include an absorbance profile having a red light or orange-red light absorbance peak with a center wavelength and/or peak location between about 600 nm and about 680 nm. In some embodiments, the spectral bandwidth of the red light or orange-red light absorbance peak can be greater than or equal to about 20 nm, and the attenuation factor of the red light absorbance peak is greater than or equal to about 0.8.

Some embodiments provide a method of manufacturing a lens. The method can include forming a lens having an optical filter configured to attenuate visible light in a plurality of spectral bands. Each of the plurality of spectral bands can include an absorbance peak with a spectral bandwidth, a maximum absorbance, and an integrated absorptance peak area within the spectral bandwidth. An attenuation factor of the absorbance peak in each of the plurality of spectral bands can be greater than or equal to about 0.8 and less than 1.

In certain embodiments, a lens can be formed by forming a lens body and forming a lens coating over the lens body. At least a portion of the optical filter can be incorporated into the lens body or the lens coating. In various embodiments, the lens coating can include an interference coating.

In some embodiments, a lens body can be formed by a method including forming a plurality of lens body elements and coupling the lens body elements to one another using one or more adhering layers. A polarizing film can be disposed between two or more of the plurality of lens body elements. In some embodiments, the polarizing film can be insert molded within the lens body. In various embodiments, the lens can include one or more components that substantially absorb ultraviolet radiation, including near ultraviolet radiation.

Some embodiments provide a lens that includes a lens body with an optical filter configured to increase the average chroma value of light transmitted through the lens within one or more portions of the visible spectrum. The chroma value is the C* attribute of the CIE L*C*h* color space. At least one portion of the visible spectrum can include a spectral range between about 440 nm and about 490 nm, between about 540 nm and about 580 nm, or between about 630 nm and about 660 nm. The increase in average chroma value can include an increase that is perceivable by a human with substantially normal vision.

In certain embodiments, the optical filter is configured to increase the average chroma value of light transmitted through the lens within one or more portions of the visible spectrum by a relative magnitude of greater than or equal to about 3% compared to the average chroma value of light transmitted through a neutral filter within the same spectral range.

The optical filter can be configured to increase the average chroma value of light transmitted through the lens within one or more portions of the visible spectrum by a relative magnitude of greater than or equal to about 15% compared to the average chroma value of light transmitted through a neutral filter within the same spectral range.

In some embodiments, the optical filter does not substantially decrease the average chroma value of light transmitted through the lens within the one or more portions of the visible spectrum when compared to the average chroma value of light transmitted through a neutral filter.

Certain embodiments provide a lens including a lens body and an optical filter configured to attenuate visible light in a plurality of spectral bands. Each of the plurality of spectral bands includes an absorbance peak with a spectral bandwidth, a maximum absorbance, lower and upper edge portions that are substantially below the maximum absorbance, and a middle portion positioned between the lower and upper edge portions and including the maximum absorbance and a region substantially near the maximum absorbance. In some embodiments, one of the lower or upper edge portions of at least one absorbance peak lies within an object spectral window including a spectral region in which the object emits or reflects a substantial visible stimulus.

The optical filter can be configured such that one of the lower or upper edge portions of at least one absorbance peak lies within a background spectral window. The background spectral window includes a spectral region in which the background emits or reflects a substantial visible stimulus.

One aspect of the embodiments disclosed herein is implemented in an eyewear comprising a lens comprising an optical filter. The optical filter is configured to attenuate visible light in at least a first spectral band and a second spectral band. Each of the first and second spectral bands comprise an absorbance peak with a spectral bandwidth; a maximum absorbance; a center wavelength located at a midpoint of the spectral bandwidth; and an integrated absorptance peak area within the spectral bandwidth. The spectral bandwidth is equal to the full width of the absorbance peak at 80% of the maximum absorbance of the absorbance peak. The first spectral band comprises a first absorbance peak having a first center wavelength in the wavelength range between about 450 nm and about 490 nm and the second spectral band comprises a second absorbance peak having a second center wavelength in the wavelength range between about 550 nm and about 590 nm. An attenuation factor of the first and second absorbance peaks is greater than or equal to about 0.8 and less than 1, wherein the attenuation factor of an absorbance peak is obtained by dividing an integrated absorptance peak area within the spectral bandwidth by the spectral bandwidth of the absorbance peak. The lens has a CIE chromaticity x value between about 0.35 and 0.5. The optical filter can be configured to increase the average chroma value of uniform intensity light stimuli having a bandwidth of 30 nm transmitted through the lens at least partially within the first spectral band by an amount between about 10% and about 25%. The eyewear can be adapted to view objects on a surface of water or underwater.

Another aspect of the embodiments disclosed herein is implemented in an eyewear comprising a lens comprising an optical filter. The optical filter is configured to attenuate visible light in at least a first spectral band, a second spectral band and a third spectral band. Each of the first, second and third spectral bands comprises an absorbance peak with a spectral bandwidth; a maximum absorbance; a center wavelength located at a midpoint of the spectral bandwidth; and an integrated absorptance peak area within the spectral bandwidth. The spectral bandwidth is equal to the full width of the absorbance peak at 80% of the maximum absorbance of the absorbance peak. The first spectral band comprises a first absorbance peak having a first center wavelength in the wavelength range between about 450 nm and about 490 nm. The second spectral band comprises a second absorbance peak having a second center wavelength in the wavelength range between about 550 nm and about 590 nm. The third spectral band comprises a second absorbance peak having a third center wavelength in the wavelength range between about 630 nm and about 670 nm. An attenuation factor of the first and second absorbance peaks is greater than or equal to about 0.8 and less than 1 and an attenuation factor of the third absorbance peak is greater than or equal to about 0.3 and less than or equal to 0.8, wherein the attenuation factor of an absorbance peak is obtained by dividing an integrated absorptance peak area within the spectral bandwidth by the spectral bandwidth of the absorbance peak. The lens can have a CIE chromaticity x value between about 0.35 and 0.5. The optical filter can be configured to increase the average chroma value of uniform intensity light stimuli having a bandwidth of 30 nm transmitted through the lens at least partially within the first spectral band by an amount between about 20% and about 40%. The eyewear can be adapted to view objects on grass.

Yet another aspect of the embodiments disclosed herein is implemented in an eyewear comprising a lens comprising an optical filter. The optical filter is configured to attenuate visible light in at least a first spectral band and a second spectral band. Each of the first and second spectral bands comprises an absorbance peak with a spectral bandwidth; a maximum absorbance; a center wavelength located at a midpoint of the spectral bandwidth; and an integrated absorptance peak area within the spectral bandwidth. The spectral bandwidth is equal to the full width of the absorbance peak at 80% of the maximum absorbance of the absorbance peak. The first spectral band comprises a first absorbance peak having a first center wavelength in the wavelength range between about 450 nm and about 490 nm and the second spectral band comprises a second absorbance peak having a second center wavelength in the wavelength range between about 630 nm and about 670 nm. An attenuation factor of the first absorbance peak is greater than or equal to about 0.8 and less than 1 and an attenuation factor of the third absorbance peak is greater than or equal to about 0.4 and less than or equal to 0.9, wherein the attenuation factor of an absorbance peak is obtained by dividing an integrated absorptance peak area within the spectral bandwidth by the spectral bandwidth of the absorbance peak. The lens can have a CIE chromaticity x value between about 0.35 and 0.5. The optical filter can be configured to increase the average chroma value of uniform intensity light stimuli having a bandwidth of 30 nm transmitted through the lens at least partially within the first spectral band by an amount between about 20% and about 40%. The eyewear can be adapted to view objects on snow.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION OF PREFERRED EMBODIMENTS

Figure 1A:
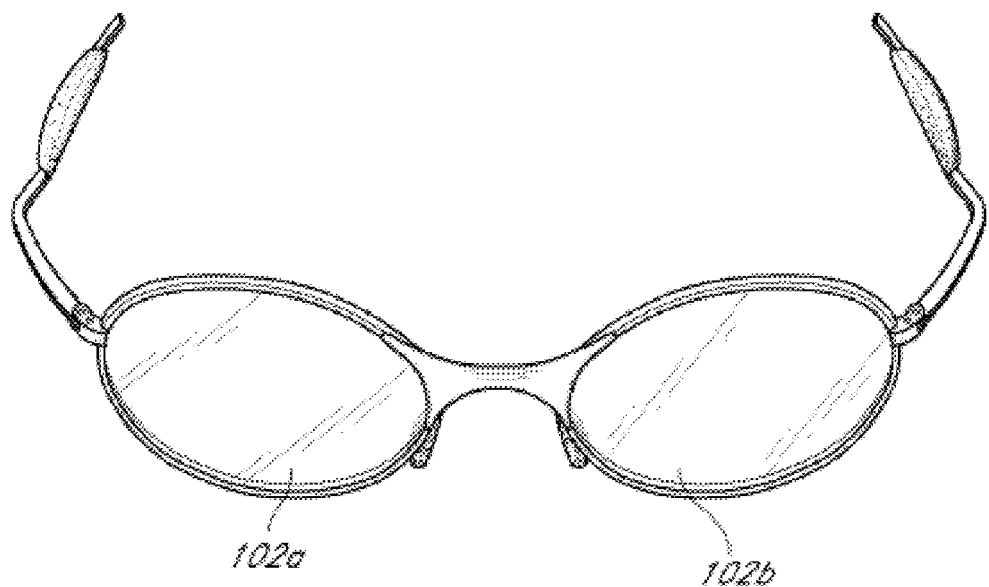
FIG. 1A is a perspective view of a pair of spectacles incorporating lenses with a chroma-enhancing optical filter.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Objects that humans can visually observe in the environment typically emit, reflect, or transmit visible light from one or more surfaces. The surfaces can be considered an array of points that the human eye is unable to resolve any more finely. Each point on the surfaces does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

An optical filter can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. An optical filter for eyewear can be configured to substantially increase the colorfulness, clarity, and/or vividness of a scene. Such an optical filter for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing a lens incorporating an optical filter disclosed herein can perceive a substantial increase in the clarity of a scene. The increase in perceived clarity can result, for example, from increased contrast, increased chroma, or a combination of factors.

The vividness of interpreted colors is correlated with an attribute known as the chroma value of a color. The chroma value is one of the attributes or coordinates of the CIE L*C*h* color space. Together with attributes known as hue and lightness, the chroma can be used to define colors that are perceivable in human vision. It has been determined that visual acuity is positively correlated with the chroma values of colors in an image. In other words, the visual acuity of an observer is greater when viewing a scene with high chroma value colors than when viewing the same scene with lower chroma value colors.

An optical filter can be configured to enhance the chroma profile of a scene when the scene is viewed through a lens that incorporates the optical filter. The optical filter can be configured to increase or decrease chroma in a plurality of spectral ranges (e.g., two spectral ranges, three spectral ranges, four spectral ranges or five spectral ranges) in order to achieve any desired effect. The spectral ranges over which an optical filter increases or decreases chroma can be called chroma enhancement windows (CEWs). The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted.

In some embodiments, CEWs include portions of the visible spectrum in which an optical filter provides a substantial change in chroma compared to a neutral filter having the same average attenuation within each 30 nm stimulus band, as perceived by a person with normal vision. In certain cases, a substantial enhancement of chroma can be seen when a filter provides a chroma increase greater than or equal to about 2% compared to the neutral filter. In other cases, a chroma increase greater than or equal to about 3% or greater than or equal to about 5% compared to the neutral filter is considered a substantial increase. Whether a chroma change represents a substantial increase can depend on the spectral region in which the increase is provided. For example, a substantial chroma enhancement can include an increase in chroma greater than or equal to about 6% over a neutral filter when the visual stimulus is centered at about 560 nm. A substantial chroma enhancement can include an increase in chroma greater than or equal to about 3% over a neutral filter when the visual stimulus is centered at about 660 nm. A substantial chroma enhancement can include an increase in chroma greater than or equal to about 15% over a neutral filter when the visual stimulus is centered at about 570 nm. Accordingly, the amount of change in chroma relative to the neutral filter that is considered substantial can differ depending on the spectral range of the CEW.

In certain embodiments, a substantial chroma enhancement is provided by an optical filter configured to increase chroma in one or more CEWs over a neutral filter without any significant decrease in chroma compared to a neutral filter within the one or more CEWs. A substantial chroma enhancement can also be provided by an embodiment of an optical filter configured to increase chroma in one or more CEWs over a neutral filter without any significant decrease in chroma compared to a neutral filter within a particular spectral range, such as, for example, between about 420 nm and about 650 nm.

In the embodiment illustrated in FIG. 1A, eyewear 100 includes lenses 102a, 102b having a chroma-enhancing optical filter. The chroma-enhancing filter generally changes the colorfulness of a scene viewed through one or more lenses 102a, 102b, compared to a scene viewed through a lens with a neutral density optical filter having the same luminous transmittance as the chroma-enhancing filter. The eyewear can be of any type, including general-purpose eyewear, special-purpose eyewear, sunglasses, driving glasses, sporting glasses, indoor eyewear, outdoor eyewear, vision-correcting eyewear, contrast-enhancing eyewear, eyewear designed for another purpose, or eyewear designed for a combination of purposes.

Figure 1B:
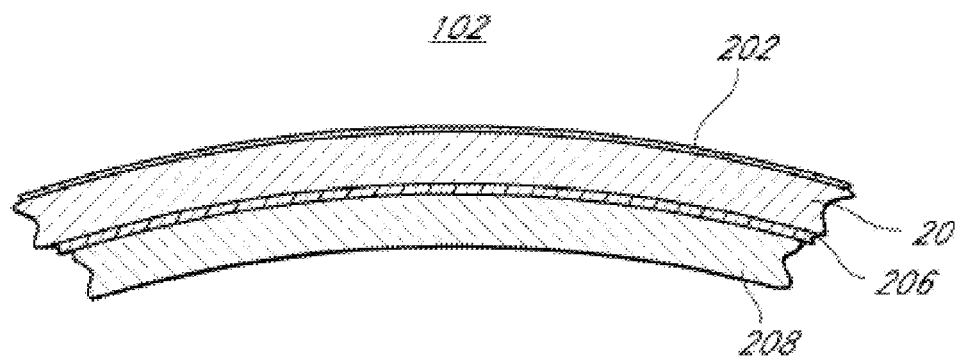
FIG. 1B is a cross-sectional view of one of the lenses shown in FIG. 1A.

In the embodiment illustrated in FIG. 1B, a lens 102 incorporates several lens elements. The lens elements include a lens coating 202, a first lens body element 204, a film layer 206, and a second lens body element 208. Many variations in the configuration of the lens 102 are possible. For example, the lens 102 can include a polarizing layer, one or more adhesive layers, a photochromic layer, an antireflection coating, a mirror coating, an interference coating, a scratch resistant coating, a hydrophobic coating, an antistatic coating, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. Alternatively, the visible light spectral profiles can cooperate to achieve any desired lens chromaticity, a chroma-enhancing effect, another goal, or any combination of goals. The polarizing layer, the photochromic layer, and/or other functional layers can be incorporated into the film layer 206, the lens coating 202, one or more of the lens body elements 204, 208, or can be incorporated into additional lens elements. In some embodiments, a lens 102 incorporates fewer than all the lens elements shown in FIG. 1B.

The lens can include a UV absorption layer or a layer that includes UV absorption outside of the optical filter layer. Such a layer can decrease bleaching of the optical filter. In addition, UV absorbing agents can be disposed in any lens component or combination of lens components.

The lens body elements 204, 208 can be made from glass, a polymeric material, a co-polymer, a doped material, another material, or a combination of materials. In some embodiments, one or more portions of the optical filter can be incorporated into the lens coating 202, into one or more lens body elements 204, 208, into a film layer 206, into an adhesive layer, into a polarizing layer, into another lens element, or into a combination of elements.

The lens body elements 204, 208 can be manufactured by any suitable technique, such as, for example, casting or injection molding. Injection molding can expose a lens to temperatures that degrade or decompose certain dyes. Thus, when the optical filter is included in one or more lens body elements, a wider range of dyes can be selected for inclusion in the optical filter when the lens body elements are made by casting than when the lens body is made by injection molding. Further, a wider range of dyes or other optical filter structures can be available when the optical filter is implemented at least partially in a lens coating.

With reference to FIGS. 1A and 1B, eyewear can include a frame and lenses 102a and 102b. The lenses 102a and 102b have a filter that enhances chroma in a wavelength-conversion window, a background-window, a spectral-width window, another CEW, or any combination of CEWs. For some applications, the spectral-width window can be omitted. For other applications, an object-specific spectral window is provided that can include the wavelength-conversion window. The lenses 102a and 102b can be corrective lenses or non-corrective lenses and can be made of any of a variety of optical materials including glasses or plastics such as acrylics or polycarbonates. The lenses can have various shapes, including plano-plano and meniscus shapes. In alternative eyewear, a frame is configured to retain a unitary lens that is placed in front of both eyes when the eyewear is worn. Goggles can also be provided that include a unitary lens that is placed in front of both eyes when the goggles are worn.

A sunglass lens substantially attenuates light in the visible spectral region. However, the light need not be attenuated uniformly or even generally evenly across the visible spectrum. Instead, the light that is attenuated can be tailored to achieve a specific chroma-enhancing profile or another goal. A sunglass lens can be configured to attenuate light in spectral bands that are selected such that the scene receives one or more of the improvements or characteristics disclosed herein. Such improvements or characteristics can be selected to benefit the wearer during one or more particular activities or in one or more specific environments.

Figure 2A:
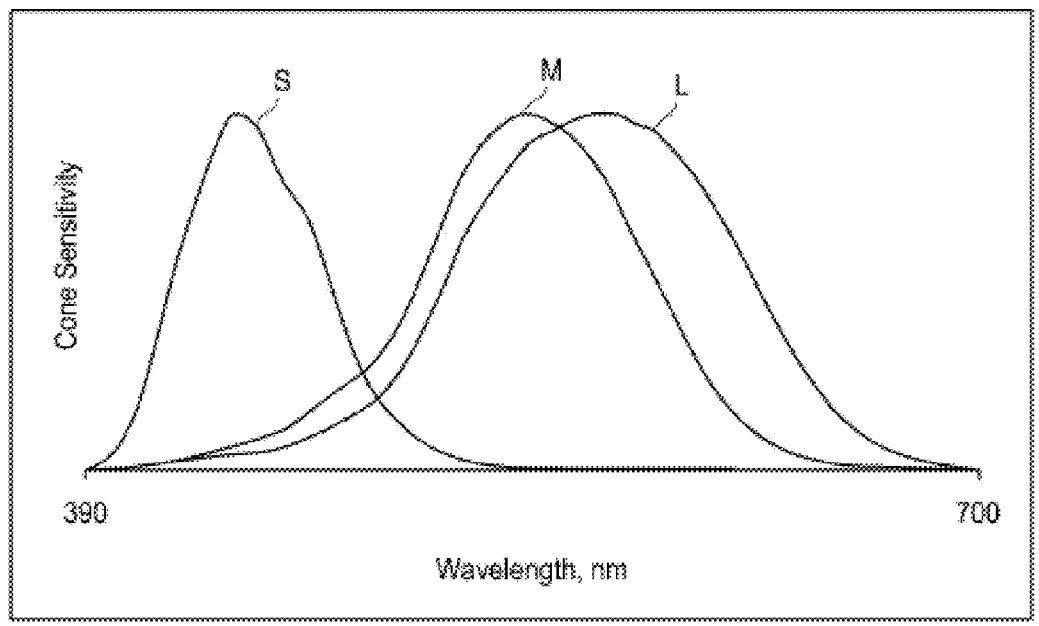
FIG. 2A is a graph showing sensitivity curves for cone photoreceptor cells in the human eye.

To design a filter that increases chroma for an array of colors, one can account for the mechanisms involved in the eye's perception of color. The photopically adapted eye (e.g., the human eye) shows peak sensitivities at 440, 545, and 565 nm. These peak sensitivities correspond to each of three optical sensors found in the eye's retina known as cones. The location and shape of the cone sensitivity profiles have recently been measured with substantial accuracy in Stockman and Sharpe, "The spectral sensitivities of the middle- and long-wavelength-sensitive cones derived from measurements in observers of known genotype," Vision Research 40 (2000), pp. 1711-1737, which is incorporated by reference herein and made a part of this specification. The sensitivity profiles S, M, L for cone photoreceptor cells in the human eye as measured by Stockman and Sharpe are shown in FIG. 2A.

Figure 2B:
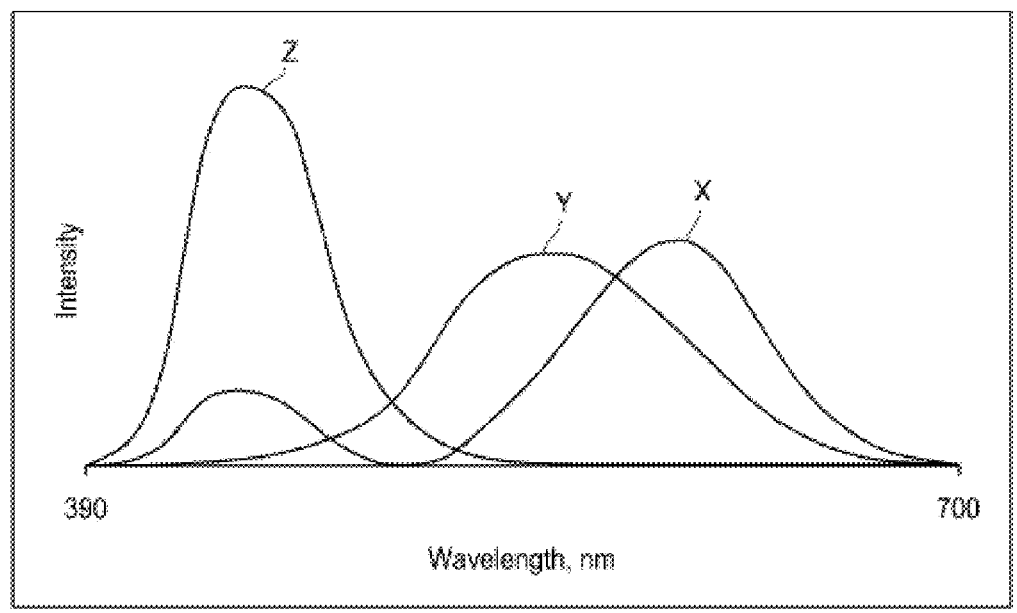
FIG. 2B is a graph showing the 1931 CIE XYZ tristimulus functions.

The cone sensitivity profiles can be converted from sensitivity data to quantities describing color such as, for example, the CIE tristimulus color values. The 1931 CIE XYZ tristimulus functions are shown in FIG. 2B. In some embodiments, the CIE tristimulus color values are used to design an optical filter. For example, the CIE color values can be used to calculate the effect of an optical filter on perceived color using values of chroma, C*, in the CIE L*C*h* color space.

The human cone sensitivities can be converted to the 1931 CIE XYZ color space using the linear transformation matrix M described in Golz and Macleod, "Colorimetry for CRT displays," J. Opt. Soc. Am. A vol. 20, no. 5 (May 2003), pp. 769-781, which is incorporated by reference herein and made a part of this specification. The linear transformation is shown in Eq. 1:

$$M = \begin{bmatrix} 0.17156 & 0.52901 & 0.02190 \\ 0.15955 & 0.48553 & 0.04298 \\ 0.01916 & 0.03989 & 1.03993 \end{bmatrix} \quad \text{(Eq. 1)}$$

$$\begin{bmatrix} L \\ M \\ S \end{bmatrix} = M \begin{bmatrix} X \\ Y \\ Z \end{bmatrix}$$

To solve for the 1931 CIE XYZ color space values (X Y Z), the Stockman and Sharpe 2000 data can be scaled by factors of 0.628, 0.42, and 1.868 for L, M, and S cone sensitivities, respectively, and multiplied by the inverse of the linear transformation matrix M in the manner shown in Eqs. 2-1 and 2-2:

$$\begin{bmatrix} X \\ Y \\ Z \end{bmatrix} = M^{-1} \begin{bmatrix} L \\ M \\ S \end{bmatrix} \quad \text{(Eq. 2-1)}$$

where:

$$M^{-1} = \begin{bmatrix} 2.89186 & -3.13517 & 0.19072 \\ 0.95178 & 1.02077 & -0.02206 \\ -0.01677 & 0.09691 & 0.95724 \end{bmatrix} \quad \text{(Eq. 2-2)}$$

The CIE tristimulus values, X Y Z, can be converted to the 1976 CIE L*a*b* color space coordinates using the nonlinear equations shown in Eqs. 3-1 through 3-7. Where $X_n=95.02$, $Y_n=100.00$, and $Z_n=108.82$ $$L^* = 116\sqrt[3]{Y/Y_n} - 16 \quad \text{(Eq. 3-1)}$$

$$a^* = 500(\sqrt[3]{X/X_n} - \sqrt[3]{Y/Y_n}) \quad \text{(Eq. 3-2)}$$

$$b^* = 200(\sqrt[3]{Y/Y_n} - \sqrt[3]{Z/Z_n}) \quad \text{(Eq. 3-3)}$$

If $X/X_n$, $Y/Y_n$, or $Z/Z_n < 0.008856$, then:

$$L^* = 903.3(Y/Y_n) \quad \text{(Eq. 3-4)}$$

$$a^* = 500[f(X/X_n) - f(Y/Y_n)] \quad \text{(Eq. 3-5)}$$

$$b^* = 200[f(Y/Y_n) - f(Z/Z_n)] \quad \text{(Eq. 3-6)}$$

For $\alpha > 0.008856$; $\alpha = X/X_n$, $Y/Y_n$, or $Z/Z_n$ $$f(\alpha) = \sqrt[3]{\alpha}$$

Otherwise:

$$f(\alpha) = 7.87\alpha + {}^{16}\!/\!_{116} \quad \text{(Eq. 3-7)}$$

Chroma or C* can be then be calculated by further conversion from CIE L*a*b* to CIE L*C*h* using Eq. 4:

$$C^* = \sqrt{a^{*2} + b^{*2}} \quad \text{(Eq. 4)}$$

As mentioned above, the colors observed in the physical world are stimulated by wide bands of wavelengths. To simulate this and then calculate the effects of an optical filter, filtered and non-filtered bands of light are used as input to the cone sensitivity space. The effect on chroma can then be predicted via the transformations listed above.

When inputting a spectrum of light to the cone sensitivity space, the mechanism of color recognition in the human eye can be accounted for. Color response by the eye is accomplished by comparing the relative signals of each of the three cones types: S, M, and L. To model this with broad band light, a sum of the intensities at each wavelength in the input spectrum is weighted according to the cone sensitivity at that wavelength. This is repeated for all three cone sensitivity profiles. An example of this calculation is shown in Table A:

TABLE A

| Wavelength λ (nm) | Input light intensity, arbitrary units | | L Cone Sensitivity | | L Weighted light intensity |
|---|---|---|---|---|---|
| 500 | 0.12 | × | 0.27 | = | 0.032 |
| 501 | 0.14 | × | 0.28 | = | 0.039 |
| 502 | 0.16 | × | 0.31 | = | 0.05 |
| 503 | 0.17 | × | 0.33 | = | 0.056 |
| 504 | 0.25 | × | 0.36 | = | 0.09 |
| 505 | 0.41 | × | 0.37 | = | 0.152 |
| 506 | 0.55 | × | 0.39 | = | 0.215 |
| 507 | 0.64 | × | 0.41 | = | 0.262 |
| 508 | 0.75 | × | 0.42 | = | 0.315 |
| 509 | 0.63 | × | 0.44 | = | 0.277 |
| 510 | 0.54 | × | 0.46 | = | 0.248 |
| 511 | 0.43 | × | 0.48 | = | 0.206 |
| 512 | 0.25 | × | 0.49 | = | 0.123 |
| 513 | 0.21 | × | 0.50 | = | 0.105 |
| 514 | 0.18 | × | 0.51 | = | 0.092 |
| 515 | 0.16 | × | 0.52 | = | 0.083 |
| 516 | 0.15 | × | 0.54 | = | 0.081 |
| 517 | 0.13 | × | 0.56 | = | 0.073 |
| 518 | 0.11 | × | 0.57 | = | 0.063 |
| 519 | 0.09 | × | 0.59 | = | 0.053 |
| 520 | 0.08 | × | 0.61 | = | 0.049 |
| Sum | 6.15 | | | | 2.664 |

Total weighted light intensity, normalized 0.433

Normalized weighted light intensities for all three cone types can then be converted to the 1931 CIE XYZ color space via a linear transformation matrix, M. This conversion facilitates further conversion to the 1976 CIE L*a*b* color space and the subsequent conversion to the CIE L*C*h color space to yield chroma values.

To simulate the effect of a filter placed between the eye and the physical world, an input band of light can be modified according to a prospective filter's absorption characteristics. The weighted light intensity is then normalized according to the total sum of light that is transmitted through the filter.

In certain embodiments, to test the effect of a filter on various colors of light, the spectral profile, or at least the bandwidth, of an input is determined first. The appropriate bandwidth for the model's input is typically affected by the environment of use for the optical filter. A reasonable bandwidth for a sunglass lens can be about 30 nm, since this bandwidth represents the approximate bandwidth of many colors perceived in the natural environment. Additionally, 30 nm is a narrow enough bandwidth to permit transmitted light to fall within responsive portions of the cone sensitivity functions, which are approximately twice this bandwidth. A filter designed using a 30 nm input bandwidth will also improve the chroma of colors having other bandwidths, such as 20 nm or 80 nm. Thus, the effect of a filter on chroma can be determined using color inputs having a 30 nm bandwidth or another suitable bandwidth that is sensitive to a wide range of natural color bandwidths.

Other bandwidths are possible. The bandwidth can be significantly widened or narrowed from 30 nm while preserving the chroma-enhancing properties of many filter designs. The 30 nm bandwidth described above is representative of wider or narrower input bandwidths that can be used to produce desired features of an optical filter. The term "bandwidth" is used herein in its broad and ordinary sense. This disclosure sets forth several techniques for characterizing the bandwidth of a spectral feature. Unless otherwise specified, any suitable bandwidth characterization disclosed herein can be applied to define the spectral features identified in this specification. For example, in some embodiments, the bandwidth of a peak encompasses the full width of a peak at half of the peak's maximum value (FWHM value) and any other commonly used measurements of bandwidth.

A sample calculation of the normalized L weighted light intensity using the 30 nm bandwidth and an example filter is shown in Table B:

TABLE B

| Wavelength λ (nm) | Incoming light intensity arbitrary units | | Filter T % | | L Cone Sensitivity | | Filtered L weighted light intensity |
|---|---|---|---|---|---|---|---|
| 499 | 0 | × | 0.12 | × | 0.25 | = | 0.00 |
| 500 | 1 | × | 0.34 | × | 0.27 | = | 0.09 |
| 501 | 1 | × | 0.41 | × | 0.28 | = | 0.11 |
| 502 | 1 | × | 0.42 | × | 0.31 | = | 0.13 |
| 503 | 1 | × | 0.44 | × | 0.33 | = | 0.15 |
| 504 | 1 | × | 0.51 | × | 0.36 | = | 0.18 |
| 505 | 1 | × | 0.55 | × | 0.37 | = | 0.20 |
| 506 | 1 | × | 0.61 | × | 0.39 | = | 0.24 |
| 507 | 1 | × | 0.78 | × | 0.41 | = | 0.32 |
| 508 | 1 | × | 0.75 | × | 0.42 | = | 0.32 |
| 509 | 1 | × | 0.85 | × | 0.44 | = | 0.37 |
| 510 | 1 | × | 0.87 | × | 0.46 | = | 0.40 |
| 511 | 1 | × | 0.91 | × | 0.48 | = | 0.44 |

TABLE B-continued

| Wavelength λ (nm) | Incoming light intensity arbitrary units | | Filter T % | | L Cone Sensitivity | | Filtered L weighted light intensity |
|---|---|---|---|---|---|---|---|
| 512 | 1 | × | 0.95 | × | 0.49 | = | 0.47 |
| 513 | 1 | × | 0.96 | × | 0.50 | = | 0.48 |
| 514 | 1 | × | 0.97 | × | 0.51 | = | 0.49 |
| 515 | 1 | × | 0.96 | × | 0.52 | = | 0.50 |
| 516 | 1 | × | 0.98 | × | 0.54 | = | 0.53 |
| 517 | 1 | × | 0.76 | × | 0.56 | = | 0.43 |
| 518 | 1 | × | 0.75 | × | 0.57 | = | 0.43 |
| 519 | 1 | × | 0.61 | × | 0.59 | = | 0.36 |
| 520 | 1 | × | 0.55 | × | 0.61 | = | 0.34 |
| 521 | 1 | × | 0.48 | × | 0.72 | = | 0.35 |
| 522 | 1 | × | 0.42 | × | 0.78 | = | 0.33 |
| 523 | 1 | × | 0.41 | × | 0.81 | = | 0.33 |
| 524 | 1 | × | 0.35 | × | 0.84 | = | 0.29 |
| 525 | 1 | × | 0.33 | × | 0.85 | = | 0.28 |
| 526 | 1 | × | 0.31 | × | 0.88 | = | 0.27 |
| 527 | 1 | × | 0.28 | × | 0.87 | = | 0.24 |
| 528 | 1 | × | 0.27 | × | 0.89 | = | 0.24 |
| 529 | 1 | × | 0.22 | × | 0.91 | = | 0.20 |
| 530 | 0 | × | 0.18 | × | 0.92 | = | 0.00 |
| 531 | 0 | × | 0.15 | × | 0.93 | = | 0.00 |
| Sum | 30 | | 18.4 | | | | 9.51 |

Total Filtered L Weighted Light Intensity, Normalized 0.52

In some embodiments, an optical filter is designed by using spectral profiles of candidate filters to calculate the effect of the candidate filters on chroma. In this way, changes in the filter can be iteratively checked for their effectiveness in achieving a desired result. Alternatively, filters can be designed directly via numerical simulation. Examples and comparative examples of optical filters and the effects of those optical filters on chroma are described herein. In each case, the chroma of input light passing through each filter is compared to the chroma of the same input without filtering. Plots of "absorptance %" against visible spectrum wavelengths show the spectral absorptance profile of the example or comparative example optical filter. Each plot of "chroma, C*, relative" against visible spectrum wavelengths shows the relative chroma of a 30 nm wide light stimulus of uniform intensity after the stimulus passes through a wavelength-dependent optical filter as a thinner curve on the plot, with the center wavelength of each stimulus being represented by the values on the horizontal axis. Each plot of "chroma, C*, relative" also shows the relative chroma of the same 30 nm wide light stimulus passing through a neutral filter that attenuates the same average percentage of light within the bandwidth of the stimulus as the wavelength-dependent optical filter.

A CIE xy chromaticity diagram for various implementations of an optical filter is also disclosed herein. The chromaticity diagram shows the chromaticity of the filter as well as the gamut of an RGB color space. Each of the chromaticity diagrams provided in this disclosure shows the chromaticity of the associated filter or lens, where the chromaticity is calculated using CIE illuminant D65.

One goal of filter design can be to determine the overall color appearance of a lens. In some embodiments, the perceived color of overall light transmitted from the lens is bronze, amber, violet, gray, or another color. In some cases, the consumer has preferences that are difficult to account for quantitatively. In certain cases, lens color adjustments can be accomplished within the model described in this disclosure. The impact of overall color adjustments to the filter design can be calculated using a suitable model. In some cases, color adjustments can be made with some, little, or no sacrifice to the chroma characteristics being sought. In some embodiments, a lens has an overall color with a relatively low chroma value. For example, the lens can have a chroma value of less than 60. A chroma-increasing optical filter used in such a lens can provide increased colorfulness for at least some colors as compared to when the same optical filter is used in a lens with an overall color having a higher chroma value.

The spectral features of an optical filter can be evaluated by considering the transmittance profile of the filter and/or a lens incorporating the filter. In some embodiments, the bandwidth and/or attenuation factors of transmittance valleys can be measured. The bandwidth of a transmittance valley can be defined, for example, as the full width of the valley at a certain transmittance, such as 2%, 5%, 10%, or 20%. In certain embodiments, the bandwidth of a transmittance valley is defined as the full width of the valley at 1.5 times, two times, four times, ten times, or one hundred times the minimum transmittance. In some embodiments, the bandwidth of a transmittance valley is defined as the full width of the valley at a certain offset from the minimum transmittance, such as, for example, the minimum transmittance plus 1% transmittance, plus 2% transmittance, plus 5% transmittance, plus 10% transmittance, or plus 20% transmittance. The attenuation factor of a transmittance valley can be calculated by dividing the area between 100% and the transmittance profile curve by the bandwidth, within the spectral bandwidth of the transmittance valley. Alternatively, the attenuation factor of a transmittance valley can be calculating by finding the absorptance within the bandwidth by subtracting the area under the transmittance curve from 1 and dividing the result by the bandwidth.

The spectral features of an optical filter can also be evaluated by considering the absorbance profile of the filter and/or a lens incorporating the filter. In some embodiments, an optical filter is configured to increase or maximize chroma in the blue to blue-green region of the visible spectrum. A filter with such a configuration can have an absorbance peak centered in a wavelength range between about 445 nm and about 490 nm. In some implementations, the full width at half maximum (FWHM) of the absorbance peak can be about 20 nm. However, in other implementations, the FWHM of the absorbance peak can be greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorbance peak can be measured in any suitable fashion in addition to or in place of FWHM. For example, the bandwidth of an absorbance peak can include the full width of a peak at 80% of the maximum, the full width of a peak at 90% of the maximum, the full width of a peak at 95% of the maximum, or the full width of a peak at 98% of the maximum.

In some embodiments, an optical filter is configured to increase or maximize chroma across several, many, or most colors, or at least many colors that are commonly encountered in the environment of the wearer. Such an optical filter can include a plurality of absorbance peaks. For example, an embodiment of an optical filter configured to provide chroma enhancement at different colors can include three or more absorbance peaks. For example, an implementation of a multicolor chroma enhancement optical filter can have four absorbance peaks with center wavelengths at about 415 nm, about 478 nm, about 574 nm, and about 715 nm. A relative chroma plot of such an optical filter will show that the implementation of the optical filter can provide a substantial increase in chroma in at least four spectral windows compared to a neutral filter having the same integrated light transmittance within each 30 nm stimulus band as within each corresponding band of the optical filter.

Many other variations in the location and number of absorbance peaks are possible. For example, some embodiments significantly attenuate light between about 558 nm and about 580 nm by providing a peak at about 574 nm and adding an additional peak at about 561 nm. Such embodiments can provide substantially greater chroma in the green region, including at wavelengths near about 555 nm.

In certain embodiments, an optical filter increases chroma in the visible spectrum by increasing the degree to which light within the bandwidth of each absorbance peak is attenuated. The degree of light attenuation within the spectral bandwidth of an absorbance peak can be characterized by an "attenuation factor" defined as the integrated absorptance peak area within the spectral bandwidth of the absorbance peak divided by the spectral bandwidth of the absorbance peak. An example of an absorbance peak with an attenuation factor of 1 is a square wave. Such an absorbance peak attenuates substantially all light within its spectral bandwidth and substantially no light outside its spectral bandwidth. In contrast, an absorbance peak with an attenuation factor of less than 0.5 attenuates less than half of the light within its spectral bandwidth and can attenuate a significant amount of light outside its spectral bandwidth.

In certain embodiments, an optical filter is configured to have one or more absorbance peaks with an attenuation factor close to 1. Many other configurations are possible. In some embodiments, an optical filter has one or more absorbance peaks (or transmittance valleys) with an attenuation factor greater than or equal to about 0.8, greater than or equal to about 0.9, greater than or equal to about 0.95, greater than or equal to about 0.98, between about 0.8 and about 0.99, greater than or equal to about 0.8 and less than 1, or between any of the other foregoing values. Any combination of one or more of the foregoing limitations on attenuation factor can be called "attenuation factor criteria." In certain embodiments, the attenuation factor of each absorbance peak in an optical filter meets one or more of the attenuation factor criteria. In some embodiments, the attenuation factor of each absorbance peak having a maximum absorbance over a certain absorbance threshold in an optical filter meets one or more of the attenuation factor criteria. The absorbance threshold can be about 0.5, about 0.7, about 0.9, about 1, between 0.5 and 1, or another value. It is understood that while certain spectral features are described herein with reference to an optical filter, each of the spectral features can equally apply to the spectral profile of a lens containing the optical filter, unless indicated otherwise.

In some embodiments, an optical filter has absorbance peaks in each of four spectral bands, each of which has an attenuation factor greater than or equal to about 0.95. Because it is rare to observe monochromatic light in the physical world, some narrow bands of light can be nearly or completely blocked out without significant detriment to the overall variety of perceived spectral colors in the natural world. In other words, the optical filter can be employed in everyday vision without the loss of any substantial visual information.

In some embodiments, an optical filter has one or more absorbance peaks with a bandwidth that is at least partially within a chroma enhancement window. The width of the chroma enhancement window can be between about 22 nm and about 45 nm, between about 20 nm and about 50 nm, greater than or equal to about 20 nm, greater than or equal to about 15 nm, or another suitable bandwidth range. In certain embodiments, an optical filter is configured such that every absorbance peak with an attenuation factor greater than or equal to a threshold has a bandwidth within a chroma enhancement window. For example, the bandwidth of each of the absorbance peaks can be greater than or equal to about 10 nm, greater than or equal to about 15 nm, greater than or equal to about 20 nm, greater than or equal to about 22 nm, less than or equal to about 60 nm, less than or equal to about 50 nm, less than or equal to about 40 nm, between about 10 nm and about 60 nm, between about 20 nm and about 45 nm, or between any of the other foregoing values.

Variations in the bandwidth (e.g., the FWHM value) and in the slopes of the sides of an absorbance peak can have marked effects on chroma. Generally, increases in the FWHM and/or slopes of the chroma-enhancing peaks are accompanied by increases in chroma and vice-versa, in the case of chroma-lowering peaks.

By controlling chroma according to the techniques disclosed herein, the chroma of one or more color bands can also be decreased in situations where less colorfulness in those color bands is desired. In some embodiments, an optical filter can be configured to decrease chroma in one or more color bands and increase chroma in other color bands. For example, eyewear designed for use while hunting ducks can include one or more lenses with an optical filter configured to lower the chroma of a blue background and increase the chroma for green and brown feathers of a duck in flight. More generally, an optical filter can be designed to be activity-specific by providing relatively lower chroma in one or more spectral regions associated with a specific background (e.g., the ground, the sky, an athletic field or court, a combination, etc.) and providing relatively high chroma in one or more spectral regions associated with a specific foreground or object (e.g., a ball). Alternatively, an optical filter can have an activity-specific configuration by providing increased chroma in both a background spectral region and an object spectral region.

The ability to identify and discern moving objects is generally called "Dynamic Visual Acuity." An increase in chroma in the spectral region of the moving object is expected to improve this quality because increases in chroma are generally associated with higher color contrast. Furthermore, the emphasis and de-emphasis of specific colors can further improve Dynamic Visual Acuity. Various embodiments of optical filters described herein can be configured to increase Dynamic Visual Acuity in addition to chroma. For example, an implementation of an optical filter configured to increase Dynamic Visual Acuity can provide high chroma in the green to orange spectral region and relatively lower chroma in the blue spectral region.

Figure 3:
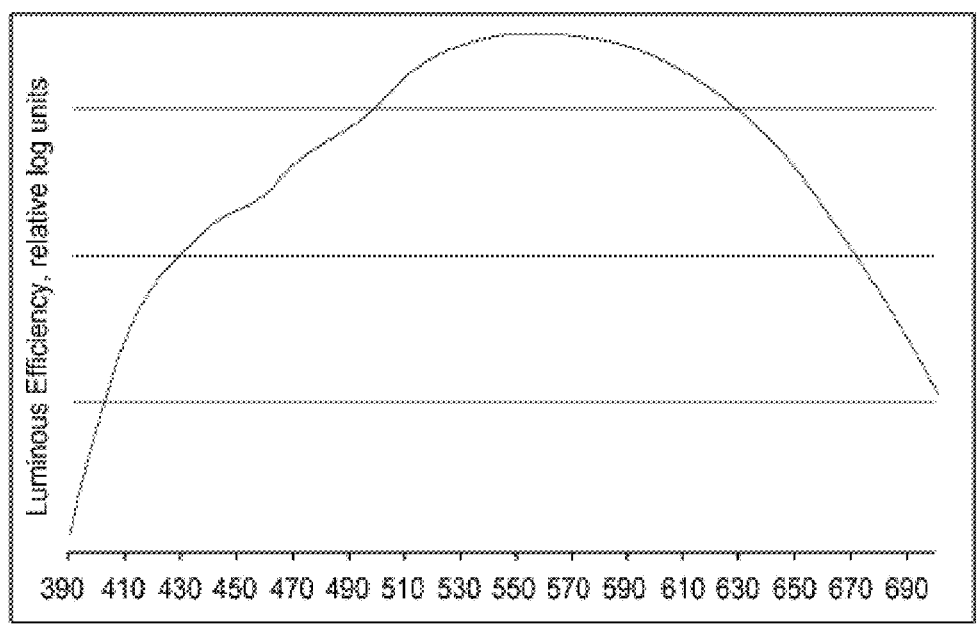
FIG. 3 is a graph showing the luminous efficiency profile of the human eye.

In some embodiments, an optical filter is configured to account for variation in luminous efficiency over the visible spectrum. By accounting for luminous efficiency, the filter can compensate for differences in relative sensitivities at different wavelengths of the human eye to various color bands can be compared. Luminous efficiency over the visible spectrum, consistent with the Stockman and Sharpe cone sensitivity data, is shown in FIG. 3.

In certain embodiments, an optical filter is configured to selectively increase chroma in the red wavelengths at which the human color eye is most sensitive. For example, the red color band can be described as the spectral range extending between about 625 nm and about 700 nm. When looking at the luminous efficiency function shown in FIG. 3, it is apparent that the eye is significantly more sensitive to red light between about 625 nm and 660 nm than at longer wavelengths. Accordingly, an optical filter that is configured to increase chroma in red wavelengths can have an absorbance peak centered at wavelengths between about 650 nm and 660 nm such that chroma is increased for red wavelengths over the red band up to 655 nm with an accompanying decrease in chroma for red above 660 nm, where the eye is less sensitive.

As another example, optical filters configured to increase chroma for wavelengths in the middle of the green range can have an absorbance peak centered at about 553 nm, at about 561 nm, or at a wavelength between about 550 nm and about 570 nm. Such a filter can also decrease chroma of yellow colors, so it can be used in activities that benefit from identifying green objects that are viewed against a yellow background.

Various implementations of optical filters configured to increase chroma in a plurality of spectral bands are described in U.S. Publication No. 2013/0141693 which is incorporated herein by reference in its entirety.

A filter can include a chroma-enhancing window (CEW) that is configured to enhance the chroma within a portion, substantially all, or the entire spectral window of a visual stimulus. An optical filter can provide one or more edges of an absorptance peak within the spectral windows where a stimulus is located. For example, the spectral location of a blue light CEW can be selected to correspond to a particular fluorescent agent so that eyewear can be spectrally matched to a particular fluorescent agent. Thus, eyewear and golf balls can be spectrally matched to provide enhanced golf ball visibility. Light at wavelengths below about 440 nm can be attenuated so that potentially harmful short wavelength radiation does not enter the eye. For example, some of this short wavelength radiation can be converted by the fluorescent agent to radiation at wavelengths corresponding to a blue light CEW. The average visible light transmittance of a golf lens can be about 20%-30%. Filters for outdoor use typically have average transmittances between about 8%-80%, 10%-60%, or 10%-40%. Filters for indoor use (or use at illumination levels lower than normal daylight illumination) can have average transmittances between about 20%-90%, 25%-80%, or 40%-60%.

Green grass and vegetation typically provide a reflected or emitted spectral stimulus with a light intensity maximum at a wavelength of about 550 nm. As mentioned above, wavelengths from about 500 nm to about 600 nm can define a green or background spectral window. Without a green light CEW, light at wavelengths between 500 nm and 600 nm can have lower chroma than desired, and vegetation can appear relatively muted, drab, or dark. As a result, the golfer's surroundings would appear unnatural and the golfer's perception of vegetation would be impaired. This impairment is especially serious with respect to putting because the golfer generally tries to precisely determine various parameters of the putting surface, including height and thickness of the grass covering the putting surface, orientation of the blades of grass of the putting surface, and the surface topography. Because a golfer takes about one-half of her strokes at or near putting surfaces, any visual impairments at putting surfaces are serious performance disadvantages and are generally unacceptable. Misperception of vegetation is also a significant disadvantage when playing out of a fairway or rough. A green light CEW, in combination with a blue light CEW, permits enhanced golf ball visibility while permitting accurate assessment of background surfaces such as putting surfaces or other vegetation. An optical filter can enhance the chroma of a desired object and background by exhibiting at least one edge of an absorptance peak within one or both of the green light CEW and the blue light CEW. The concurrence of at least one edge of an absorptance peak within one or both of the green or blue spectral windows further aids the human eye in distinguishing a golf ball from its surroundings by enhancing the chroma of the ball, the chroma of the vegetation, or the chroma of both the ball and vegetation.

A red light CEW can extend over a wavelength range from about 610 nm to about 720 nm, but the transmission of radiation at wavelengths beyond about 700 nm provides only a small contribution to a viewed scene because of the low sensitivity of the human eye at these wavelengths. A red light CEW can enhance the natural appearance of scenery viewed with an embodiment of an improved optical filter by enhancing the chroma of at least some red light reflected by vegetation. For example, chroma enhancement can be seen in FIG. 40, where at least one edge of the red absorptance peak (e.g., the absorptance peak between about 630 nm and about 660 nm) falls within the red light CEW. The more polychromatic light produced by enhancing the chroma of red, green, and blue components of light permits improved focus. In addition, convergence (pointing of the eyes to a common point) and focusing (accommodation) are interdependent, so that improved focusing permits improved convergence and improved depth perception. Providing CEWs in the green and red portions of the visible spectrum can result in improved depth perception as well as improved focus. A filter having such CEWs can improve perception of vegetation (especially putting surfaces) and provide more natural looking scenery while retaining the enhanced golf ball visibility associated with the blue light CEW. An optical filter that provides at least one edge of an absorption peak within a CEW can enhance the quality of the light transmitted through the optical filter by increasing its chroma value.

Optical filters having CEWs covering one or more spectral ranges can provide enhanced visibility. Optical filters having such a spectral profile can be selected for a particular application based on ease of fabrication or a desire for the optical filter to appear neutral. For cosmetic reasons, it can be desirable to avoid eyewear that appears tinted to others.

Optical filters can be similarly configured for a variety of activities in which tracking and observation of an object against a background is facilitated by wavelength-conversion. Such filters can include a wavelength-conversion window, a background window, and a spectral-width window. These CEWs are selected to enhance the chroma of wavelength-converted light, light from activity-specific backgrounds, and light at additional wavelengths to further extend the total spectral width of chroma-enhanced light to improve focus, accommodation, or provide more natural viewing. For application to a white golf ball as described above, an optical filter is provided with a blue light CEW corresponding to wavelength-conversion spectral components, a green light CEW to facilitate viewing of a background, and a red light CEW to improve accommodation and the natural appearance of scenes. Such an optical filter can have a substantially neutral color density. For other activities, particular CEWs can be chosen based on expected or measured background colors and wavelengths produced by a wavelength-conversion process. For example, tennis is often played on a green playing surface with a yellow ball. Such a ball typically has a wavelength conversion region that produces wavelength-converted light at wavelengths between about 460 nm and 540 nm. An example filter for such an application has a wavelength-conversion window at between about 460 nm to about 540 nm, and a background window centered at about 550 nm. The wavelength-conversion window and the background window can have some overlap. To provide more natural contrast and better focus, additional transmission windows can be provided in wavelength ranges of about 440 nm to about 460 nm, from about 620 nm to about 700 nm, or in other ranges.

In alternative embodiments, an optical filter having an object-specific spectral window in addition to or instead of a wavelength-conversion window is provided. For example, for viewing of a golf ball that appears red, the optical filter can include a red light CEW that enhances the chroma of red light to improve golf ball visibility. For natural, accurate viewing of backgrounds (such as putting surfaces), a green light CEW is also provided. If the golf ball also emits wavelength converted light, an additional wavelength-conversion window can be provided, if desired. The filter can also include a spectral-width window.

In some embodiments, an optical filter is configured to change the chroma values of a scene in one or more spectral regions in which an object and/or a background reflect or emit light. An optical filter can be configured to account for spectral regions where an object of interest and the background reflect or emit light. Absorptance peaks can be positioned such that chroma is increased or decreased in one or more spectral regions where the object of interest is reflecting or emitting light and where the background is reflecting or emitting light. For example, chroma enhancement within an object or a background spectral window can be obtained by configuring an optical filter such that at least one edge of an absorptance peak is positioned within the spectral window.

An optical filter can increase contrast between the object and the background by providing chroma enhancement in one or both of the object spectral window and the background spectral window. Color contrast improves when chroma is increased. For example, when a white golf ball is viewed against a background of green grass or foliage at a distance, chroma enhancement technology can cause the green visual stimulus to be more narrowband. A narrowed spectral stimulus causes the green background to appear less washed out, resulting in greater color contrast between the golf ball and the background.

In order to fabricate the filter profiles shown above, a variety of approaches can be applied, such as through the use of dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Another suitable fabrication technique or a combination of techniques can also be used.

In certain embodiments, an optical filter includes one or more organic dyes that provide absorbance peaks with a relatively high attenuation factor. For example, in some embodiments, a lens has an optical filter incorporating organic dyes supplied by Exciton of Dayton, Ohio. At least some organic dyes supplied by Exciton are named according to the approximate center wavelength and/or peak location of their absorbance peak. For example, ABS 407, ABS 473, ABS 574, ABS 647 nm and ABS 659 dyes provide absorbance peaks at about 407 nm, 473 nm, 574 nm, 647 nm and 659 nm.

Other dyes for plastic exist that can also provide substantial increases in chroma. For example, Crysta-Lyn Chemical Company of Binghamton, N.Y. offers DLS 402A dye, with an absorbance peak at 402 nm. In some embodiments, the DLS 402A dye can be used in place of the Exciton ABS 407 dye. Crysta-Lyn also offers DLS 461B dye that provides an absorbance peak at 461 nm. DLS 461B dye can be used in place of the Exciton ABS 473 dye. Crysta-Lyn DLS 564B dye can be used in place of the Exciton ABS 574 dye, while Crysta-Lyn DLS 654B dye can be used in place of Exciton ABS 659 dye. In some embodiments, the dye can be incorporated into one or more lens components, and the decision regarding which lens components include the dye can be based on properties, such as stability or performance factors, of each specific dye.

In some embodiments, two or more dyes can be used to create a single absorbance peak or a plurality of absorbance peaks in close proximity to one another. For example, an absorbance peak with a center wavelength and/or peak location positioned between about 555 nm and about 580 nm can be creating using two dyes having center wavelengths and/or peak locations at about 561 nm and 574 nm. In another embodiment, an absorbance peak with a center wavelength and/or peak location positioned between about 555 nm and about 580 nm can be creating using two dyes having center wavelengths and/or peak locations at about 556 nm and 574 nm. While each dye can individually produce an absorbance peak having a FWHM value of less than about 30 nm, when the dyes are used together in an optical filter, the absorbance peaks can combine to form a single absorbance peak with a bandwidth of about 45 nm or greater than or equal to about 40 nm.

In some embodiments, one or more of the dyes used in any filter composition disclosed herein can be replaced by one or more dyes having similar spectral attributes. For example, if a dye, such as the Exciton ABS 473 dye, is not sufficiently stable to endure the lens formation process, one or more substitute dyes with improved stability and a similar absorbance profile can be used, instead. Some lens formation processes, such as injection molding, can subject the lens and optical filter to high temperatures, high pressures, and/or chemically active materials. Replacement dyes can be selected to have similar absorbance profiles of the dyes disclosed herein but improved stability or performance. For example, a replacement dye can exhibit high stability during injection molding of the lens or high stability under sunlight.

In some embodiments, a lens can include dyes or other materials that are selected or configured to increase the photo stability of the chroma enhancing filter and other lens components. Any technique known in the art can be used to mitigate degradation of filter materials and/or other lens components.

The relative quantities of any dye formulations disclosed herein can be adjusted to achieve a desired objective, such as, for example, a desired overall lens color, a chroma-enhancing filter having particular properties, another objective, or a combination of objectives. An optical filter can be configured to have an absorbance profile with any combination of the absorbance peaks disclosed herein and/or any combination of other absorbance peaks in order to achieve desired chroma-enhancing properties. The overall lens color can be selected such that it is similar to or the same as the stimulus of an object of interest or a background stimulus for a specific activity. By matching the color of the lens to an activity-specific stimulus, the contrast (such as, for example, color contrast) of the object of interest for that activity can be increased.

Activity Specific Optical Filters

In certain embodiments, eyewear and optical filters provide one or more CEWs corresponding to a specific activity. A filter can include one or more CEWs in a portion of the visible spectrum in which an object of interest, such as, for example, a golf ball, emits or reflects a substantial spectral stimulus. When referring to the spectral stimulus of an object of interest, a corresponding CEW can be referred to as the object spectral window. When referring to spectral stimulus of a background behind an object, a corresponding CEW can be referred to as the background spectral window. Moreover, when referring to the spectral stimulus of the general surroundings, the spectral window can be referred to as the surrounding spectral window. An optical filter can be configured such that one or more edges of an absorbance peak lie within at least one spectral window. In this way, an optical filter can enhance chroma in the spectral ranges corresponding to a given spectral stimulus (e.g. object, background, or surroundings).

In such implementations, the optical filter is configured to enhance object visibility while preserving the natural appearance of viewed scenes. Such implementations of optical filters (and implementations of eyewear that include such filters) can be configured for a wide range of recreational, sporting, professional, and other activities. For example, chroma-enhancing, enhanced-visibility filters can be provided for activities that include viewing objects against water such as fishing, sailing, rowing, surfing, etc. As another example, chroma-enhancing, enhanced-visibility filters can be provided for activities that include viewing objects against grass such as baseball, tennis, soccer, cricket, lacrosse, field hockey, etc. As another example, chroma-enhancing, enhanced-visibility filters can be provided for activities that include viewing objects indoors in artificial illumination such as badminton, basketball, target shooting, racquetball, squash, table tennis, etc. As another example, chroma-enhancing, enhanced-visibility filters can be provided for activities that include viewing objects against snow such as skiing, ice hockey. As another example, chroma-enhancing, enhanced-visibility filters can be provided for activities that include viewing objects outdoors in sunlight such as skiing, baseball, golf, shooting, hunting, soccer, etc.

Implementations of chroma-enhancing, enhanced-visibility filters that are configured for activities that include viewing objects against a particular background can have a common characteristic. For example, chroma-enhancing, enhanced-visibility filters that are provided for activities that include viewing objects against water can be configured to be polarizing to reduce glare resulting from light reflected from the water. As another example, chroma-enhancing, enhanced-visibility filters that are provided for activities that include viewing objects against water can be configured to attenuate light in the blue and/or blue-green spectral range to make objects stand-out against water. As another example, chroma-enhancing, enhanced-visibility filters that are provided for activities that include viewing objects against grass can be configured to attenuate light in the green spectral range to make objects stand-out against grass.

Specific activities can be grouped in more than one category. For example, baseball is played on grass as well as in different lighting conditions. Thus, optical filters can be further customized to provide enhanced visibility of the object under different conditions. For example, for sports such as golf, baseball and other racquet sports, the optical filter can include an object chroma enhancement window selected to increase the chroma of natural reflected light or wavelength-converted light produced by a fluorescent agent in a baseball, tennis ball, badminton birdie, or volleyball or light that is preferentially reflected by these objects. Background windows and spectral-width windows can be provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey is played on an icy surface that is provided with a wavelength-conversion agent or colorant, and lenses can be configured for viewing a hockey puck with respect to such ice. Outdoor volleyball benefits from accurate viewing of a volleyball against a blue sky, and the background filter can be selected to permit accurate background viewing while enhancing chroma in outdoor lighting. A different configuration can be provided for indoor volleyball.

Eyewear that includes such filters can be activity-specific, surface-specific, or setting-specific. In addition, tinted eyewear can be provided for activities other than sports in which it is desirable to identify, locate, or track an object against backgrounds associated with the activity. Some representative activities include dentistry, surgery, bird watching, fishing, or search and rescue operations. Such filters can also be provided in additional configurations such as filters for still and video cameras, or as viewing screens that are placed for the use of spectators or other observers. Filters can be provided as lenses, unitary lenses, or as face shields. For example, a filter for hockey can be included in a face shield.

Various embodiments of lenses including one or more filters that provide color enhancement for certain example activities are described below with references to FIGS. 4A-8C. The one or more filters can include chroma enhancement dyes and/or color enhancing chromophores as described in detail in this application, or coatings/thin film layers disposed on a substrate material, etc. In various embodiments, the one or more filters can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Some embodiments of interference coatings are sold by Oakley, Inc. of Foothill Ranch, Calif., U.S.A. under the brand name Iridium®. The example lens embodiments disclosed herein suitable for use in other applications than those indicated when such applications involve environments with similar colors of interest. The embodiments of the one or more filters for the sports activities are examples, and it is understood that other suitable filters can be used for the exemplary activities described herein.

A. Filters to Provide Color Enhancement for Viewing Objects Against Water

Various embodiments of lenses used for viewing objects against water preferably reduce glare (e.g., glare resulting from sunlight reflected from the surface of water). Reducing glare can advantageously increase the ability of seeing objects on or below the surface of water. For example, reduce glare can allow a fisherman to view underwater structures and thus allow a fisherman to see fish underwater. Reducing glare can also allow a fisherman to see the fish bait. As another example, reducing glare can allow a sailor to see buoys and other markers on the surface of water. Without subscribing to any particular theory, sunlight reflected from the surface of the water is partially polarized, thus polarized lenses can be used to reduce glare. Accordingly, various embodiments of lenses used to view objects against a backdrop including water can include light polarizing films and/or coatings to filter out polarized light reflected from the surface of the water. Various embodiments of lenses used view objects against a backdrop including water can also include filters that transmit different colors in the visible spectral range with different values to create different viewing conditions. For example, some embodiments of lenses adapted to view objects against a backdrop including water can transmit all colors of the visible spectrum such that there is little distortion on bright sunny days. As another example, some embodiments of lenses adapted to view objects against a backdrop including water can transmit colors in the yellow and red spectral ranges and attenuate and/or absorb colors in the blue and green spectral ranges. This can advantageously allow objects under water and/or on the surface of the water to be visible to the person. Various embodiments of lenses adapted to view objects against a backdrop including water can also be tinted (e.g., grey, amber, brown or yellow) to increase visibility of objects under and/or on the surface of water, reduce eye strain and/or for aesthetic purpose. For example, various embodiments of lenses adapted to view objects against a backdrop including water can have a CIE chromaticity x value greater than 0.35 and a CIE chromaticity y value greater than 0.35.

Figure 4A:
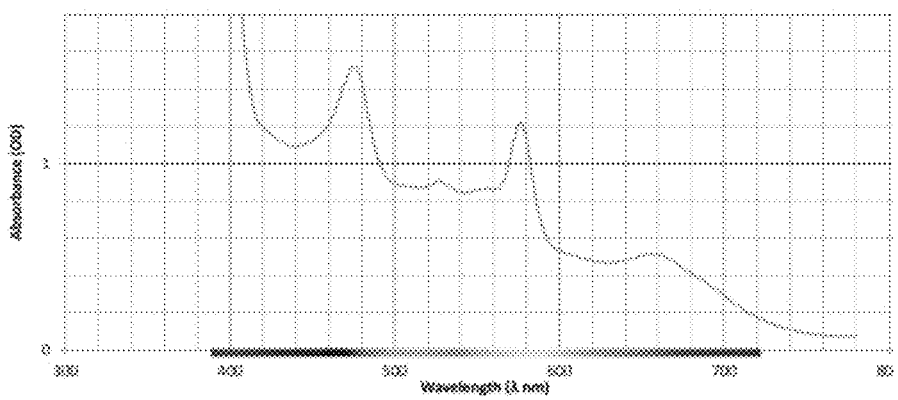
FIGS. 4A, 4B and 4C illustrate spectral characteristics of an implementation of optical filter that can be included in different embodiments of activity specific lenses.
Figure 4B:
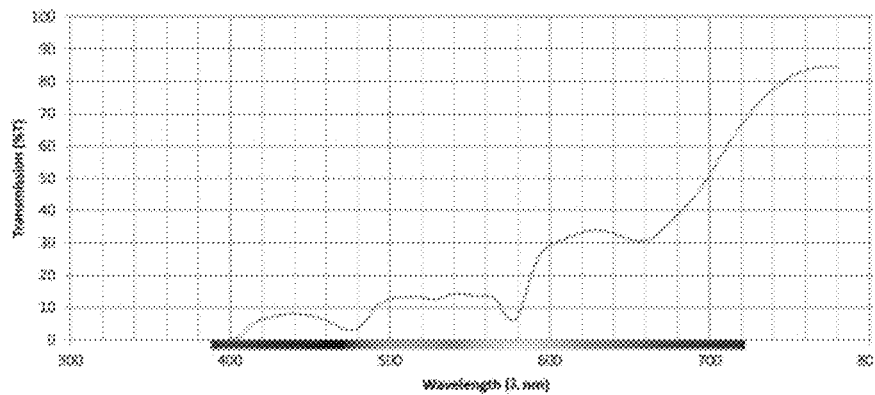
Figure 4C:
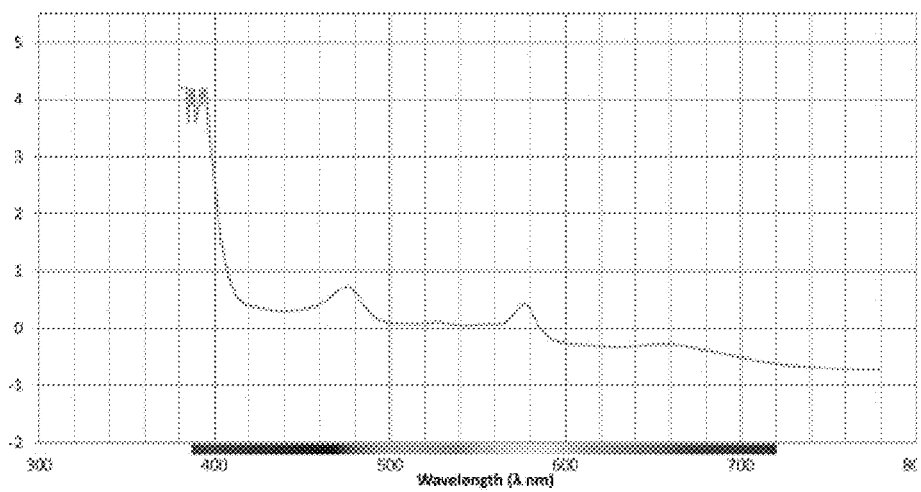

FIGS. 4A-4C illustrate the effective spectral response of one or more filters that can be included in an embodiment of a lens that is suitable for viewing objects on the surface of water or underwater. FIG. 4A illustrates the effective absorbance profile of an implementation of an optical filter that can be included in an embodiment of a lens that is suitable for viewing objects on the surface of water or underwater. FIGS. 4B and 4C show the effective transmittance profile and the relative absorbance profile of the same implementation of the optical filter. The implementation of the optical filter is configured such that the effective transmittance profile through the one or more filters has one or more "notches". The presence of the notches in the transmittance profile creates distinct "pass-bands". Wavelengths in each of the distinct pass-bands are transmitted with lower attenuation than wavelengths in the notches. The notches in the transmittance profile are depicted as "peaks" in the corresponding absorbance profile depicted in FIG. 4A. For example, as observed from FIG. 4A, the effective absorbance profile of the optical filter implementation has a first peak between about 460 nm and 495 nm and a second peak between about 560 nm and 590 nm.

Referring to FIG. 4A, it is observed that the effective absorbance profile of the optical filter implementation included in an embodiment of a lens that is suitable for viewing objects on the surface of water or underwater has a first "valley" in the wavelength range between about 410 nm and about 460 nm; a second "valley" in the wavelength range between about 500 nm and about 560 nm; and a third "valley" in the wavelength range between about 600 nm and about 700 nm. Wavelengths in the first, second and third valleys have reduced absorbance as compared to the wavelengths in the vicinity of the first and second peaks. The valleys in the absorbance profile correspond to the pass-bands in the transmittance profile. It is noted from FIG. 4A that the first peak has a full width at 80% maximum (FW80M) of about 15-30 nm around a central wavelength of about 475 nm and the second peak has a FW80M of about 10-20 nm around a central wavelength of about 575 nm.

It is observed from FIG. 4A that (i) the value of the optical density for wavelengths in the vicinity of the first peak around 475 nm is about 40% higher as compared to the average value of the optical density for wavelengths in the first valley; and (ii) the value of the optical density for wavelengths in the vicinity of the first peak around 475 nm is about 60% higher as compared to the average value of the optical density for wavelengths in the second valley. Thus, wavelengths in the vicinity of the first peak around 475 nm are attenuated by about 40% more as compared to wavelengths in the vicinity of the first valley and by about 60% more as compared to wavelengths in the vicinity of the second valley.

It is further observed from FIG. 4A that (i) the value of the optical density for wavelengths in the vicinity of the second peak around 575 nm is about 35% higher as compared to the average value of the optical density for wavelengths in the second valley; and (ii) the value of the optical density for wavelengths in the vicinity of the second peak around 575 nm is about 120% higher as compared to the average value of the optical density for wavelengths in the third valley. Thus, wavelengths in the vicinity of the second peak around 575 nm are attenuated by about 35% more as compared to wavelengths in the vicinity of the second valley and by about 120% more as compared to wavelengths in the vicinity of the third valley.

Accordingly, the optical filter implementation is configured to attenuate the wavelengths in the first peak by about 40% more on an average as compared to the wavelengths in the first valley and by about 60% more on an average as compared to the wavelengths in the second valley. Similarly, the optical filter implementation is configured to attenuate the wavelengths in the second peak by about 35% more on an average as compared to the wavelengths in the second valley and by about 120% more on an average as compared to the wavelengths in the third valley. It is observed from FIG. 4A that the second peak has a narrower bandwidth as compared to the first peak. Furthermore, the optical filter implementation included in the embodiment of the lens suitable for viewing objects on the surface of water or underwater can be configured to attenuate light having wavelengths less than 400 nm (e.g., in the ultraviolet range). Thus, the embodiment of the lens suitable for suitable for viewing objects on the surface of water or underwater can reduce the amount of ultraviolet light incident on a person's eyes thereby providing safety and health benefits. The attenuation factor of the absorbance peaks in the blue spectral region (e.g., between about 440 nm and 490 nm) and green spectral region (e.g., between about 550 nm and about 590 nm) can be greater than or equal to about 0.8 and less than 1 in various implementations of optical filters adapted to view objects on the surface of water or underwater. Without any loss of generality, the attenuation factor of an absorbance peak can be obtained by dividing an integrated absorptance peak area within the spectral bandwidth by the spectral bandwidth of the absorbance peak.

The transmittance profile depicted in FIG. 4B corresponds to the same optical filter implementation whose absorbance profile is depicted in FIG. 4A. Accordingly, the effective transmittance profile of the optical filter implementation includes a first pass-band corresponding to first valley of the absorbance profile, a second pass-band corresponding to the second valley of the absorbance profile and a third pass-band corresponding to the third valley absorbance profile. The first and the second pass-bands are separated by a first notch corresponding to the first peak of the absorbance profile. The second and the third pass-bands are separated by a second notch corresponding to the second peak of the absorbance profile.

It is observed from the transmittance profile that the first pass-band is configured to transmit less than 10% of light in the violet-blue spectral ranges (e.g., between about 410 nm and about 460 nm); the second pass-band configured to transmit between about 10% and about 20% of the light in the green-yellow spectral ranges (e.g., between about 500 nm and about 560 nm); and the third pass-band configured to transmit between about 20% and about 50% of the light in the orange-red spectral ranges (e.g., between about 600 nm and about 700 nm). It is further observed from FIG. 4B that the first and the second pass-bands have a substantially flat-top such that substantially all the wavelengths in each of the first and the second pass-bands are transmitted with almost equal intensity. Accordingly, the FW80M of the first pass-band is about 40-50 nm and the FW80M of the second pass-band is about 70-80 nm. It is also observed from FIG. 4B that the effective transmittance profile of the embodiment of the lens suitable for viewing objects on the surface of water or underwater can transmit between about 50% and about 80% of light in the wavelength range between about 700 nm and about 790 nm.

FIG. 4C illustrates the effective relative absorbance profile of an embodiment of a lens including an optical filter that is suitable for viewing objects on the surface of water or underwater. The relative absorbance profile is obtained by plotting the term $-\log_{10}(\% \ T_\lambda/\tau_v)$ with respect to the wavelength ($\lambda$). The factor % $T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed that the relative absorption has a similar profile as the absorbance profile depicted in FIG. 4B. In various embodiments, the one or more filters are configured such that the lens has a tint or chromaticity (e.g., grey, brown, amber, yellow, etc.) suitable for viewing objects on the surface of water or underwater. For example, implementations of optical filters adapted to view objects on the surface of water or underwater can have a CIE chromaticity x value greater than or equal to about 0.35, greater than or equal to about 0.38, greater than or equal to about 0.4 and/or less than or equal to about 0.5. As another example, implementations of optical filters suitable for shooting can have a CIE chromaticity x value greater than or equal to about 0.37, greater than or equal to about 0.39, greater than or equal to about 0.42 and/or less than or equal to about 0.6.

Various embodiments of lenses including the one or more filters that provide color enhancement for viewing objects on the surface of water or underwater as described above include polarization films or layers such that they are polarized to reduce glare. Various embodiments of lenses including the one or more filters that provide color enhancement for viewing objects against water as described above can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®.

B. Filters to Provide Color Enhancement for Baseball

Various embodiments of lenses used for baseball preferably allow the ball player to spot the baseball in different lighting conditions (e.g., bright lighting on sunny days, diffused lighting on cloudy days, spot lighting and flood lighting for playing at night, etc.). It would also be advantageous to include filters that make the baseball stand out against the sky and the grassy field in various embodiments of the lenses used for baseball. Additionally, various embodiments of the lenses used for baseball can include coatings, layers or films that reduce glare (e.g., glare resulting from sunlight on bright sunny days or spot lights and flood light in the night). The coatings, layers or films that reduce glare can include polarizing films and/or coatings to filter out polarized light, holographic or diffractive elements that are configured to reduce glare and/or diffusing elements. Various embodiments of lenses suitable for baseball can include implementations of optical filter that transmit different colors in the visible spectral range with different values to create different viewing conditions. For example, some embodiments of lenses for baseball can transmit all colors of the visible spectrum such that there is little distortion on bright sunny days. As another example, some embodiments of lenses for baseball can transmit colors in the yellow and red spectral ranges and attenuate and/or absorb colors in the blue and green spectral ranges such that the baseball can stand-out against the blue sky or the green grass. Various embodiments of lenses used for baseball can also be tinted (e.g., grey, green, amber, brown or yellow) to increase visibility of baseball against the sky or the grass, reduce eye strain and/or for aesthetic purpose.

Figure 5A:
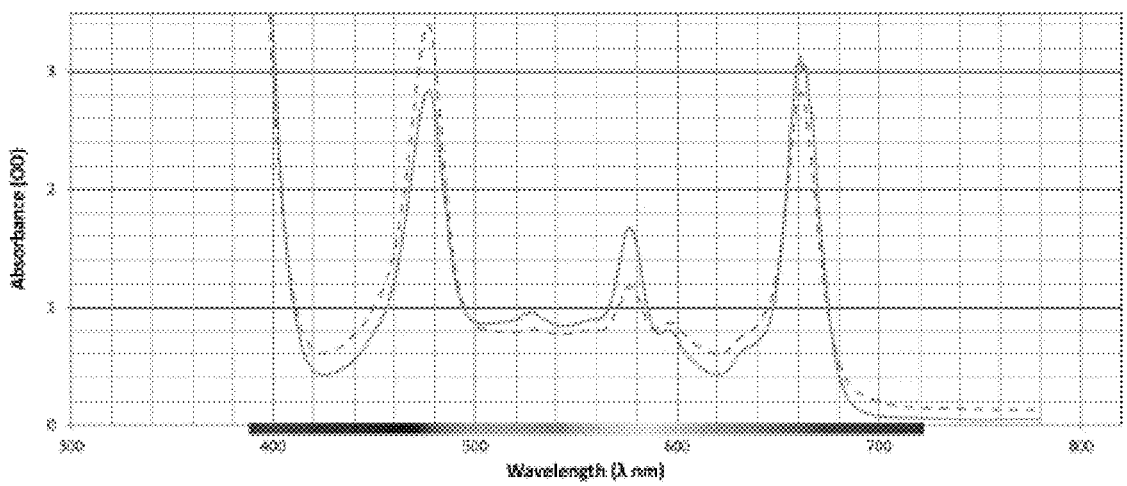
FIGS. 5A, 5B and 5C illustrate spectral characteristics of an implementation of optical filter that can be included in different embodiments of activity specific lenses.
Figure 5B:
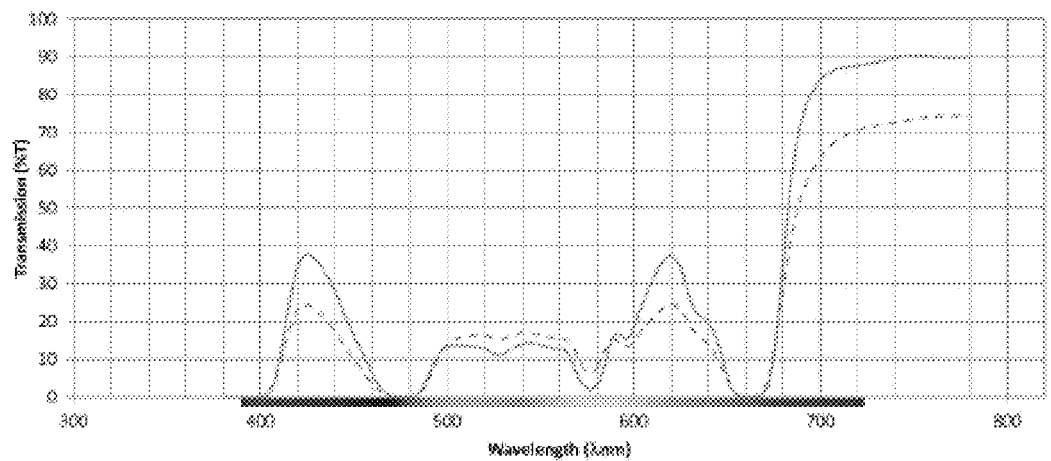
Figure 5C:
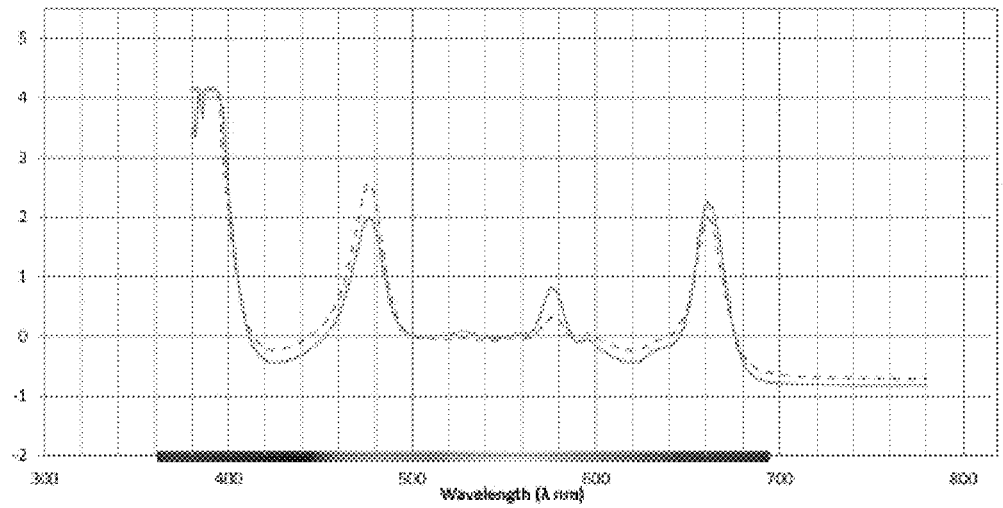

FIGS. 5A-5C illustrate the effective spectral response of implementations of optical filters that can be included in various embodiments of lenses suitable for baseball. FIG. 5A illustrates two effective absorbance profiles of implementations of optical filters that can be included in various embodiments of lenses suitable for baseball. The first effective absorbance profile represented by a solid line represents the effective absorbance profile of an optical filter implementation that can be included in an embodiment of a lens that is suitable for players in the outfield. The second effective absorbance profile represented by a dashed line represents the effective absorbance profile of an optical filter implementation that can be included in an embodiment of a lens that is suitable for players in the infield. FIG. 5B illustrates two effective transmittance profiles of the same optical filter implementations that can be included in various embodiments of lenses suitable for baseball. The first effective transmittance profile represented by a solid line represents the effective transmittance profile of the same optical filter implementation that can be included in an embodiment of a lens that is suitable for players in the outfield. The second effective transmittance profile represented by a dashed line represents the effective transmittance profile of the same optical filter implementation that can be included in an embodiment of a lens that is suitable for players in the infield. FIG. 5C illustrates two effective relative absorbance profiles of the same optical filter implementation that can be included in various embodiments of lenses suitable for baseball. The first relative absorbance profile represented by a solid line represents the effective relative absorbance profile of the same optical filter implementation that can be included in an embodiment of a lens that is suitable for players in the outfield. The second effective relative absorbance profile represented by a dashed line represents the effective relative absorbance profile of the same optical filter implementation that can be included in an embodiment of a lens that is suitable for players in the infield.

The outfield players and infield players play under different lighting conditions and thus would benefit from having lenses tailored to spot the baseball in their respective lighting conditions. Additionally, it would be advantageous for outfield players to have the ability to spot the baseball from a distance. Thus, it would be beneficial if various embodiments of lenses are configured to have different optical characteristics for infield players and outfield players. For example, since the outfield is usually sunnier than the infield and/or has less shadows as compared to the infield, it would be advantageous if the lenses configured for the players in the outfield included filters that reduced glare and overall brightness but transmitted different colors in the visible spectral range so that the white baseball can be spotted from a distance. As another example, it would be advantageous if the lenses configured for the players in the infield included filters that reduced glare, increased contrast between the blue sky and the green grass and in general made the white ball and the red stitching on the baseball stand-out against the field.

As discussed above, the effective absorbance profile depicted in FIG. 5A exhibits peaks and valleys that correspond to the pass-bands and notches exhibited by the corresponding effective transmittance profile depicted in FIG. 5B.

Referring to FIG. 5A, the effective absorbance profiles for the optical filter implementations included in embodiments of lenses suitable for players in the outfield and players in the infield each has a first peak between about 460 nm and 490 nm, a second peak between about 560 nm and 590 nm and a third peak between about 640 nm and 680 nm. The effective absorbance profile for the optical filter implementation included in embodiments of lenses suitable for players in the outfield and players in the infield each has a first valley in the wavelength range between about 410 nm and about 460 nm; a second valley in the wavelength range between about 500 nm and about 560 nm; and a third valley in the wavelength range between about 590 nm and about 640 nm. As discussed above, wavelengths in the first, second and third valleys have reduced absorbance as compared to the wavelengths in the vicinity of the first, second and third peaks.

Referring to the effective absorbance profile, depicted in FIG. 5A, for the optical filter implementation included in embodiments of lenses suitable for players in the outfield represented by the solid line, it is observed that the first peak has a full width at half maximum (FWHM) of about 25-30 nm around a central wavelength of about 475 nm, the second peak has a FW80M of about 10-15 nm around a central wavelength of about 575 nm and the third peak has a FWHM of about 20-25 nm around a central wavelength of about 660 nm.

Referring to the effective absorbance profile, depicted in FIG. 5A, for the optical filter implementations included in embodiments of lenses suitable for players in the outfield represented by the solid line, it is observed that (i) the value of the optical density for wavelengths in the vicinity of the first peak around 475 nm is about 300% higher as compared to the average value of the optical density for wavelengths in the first valley; (ii) the value of the optical density for wavelengths in the vicinity of the first peak around 475 nm is about 200% higher as compared to the average value of the optical density for wavelengths in the second valley. Thus, wavelengths in the vicinity of the first peak around 475 nm are attenuated by about 300% more as compared to wavelengths in the vicinity of the first valley and by about 200% more as compared to wavelengths in the vicinity of the second valley.

Referring to the effective absorbance profile, depicted in FIG. 5A, for the optical filter implementations included in embodiments of lenses suitable for players in the outfield represented by the solid line, it is observed that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 150% higher as compared to the average value of the optical density for wavelengths in the third valley. Thus, wavelengths in the vicinity of the second peak around 575 nm are attenuated by about 100% more as compared to wavelengths in the vicinity of the second valley and by about 150% more as compared to wavelengths in the vicinity of the third valley.

Referring to the effective absorbance profile, depicted in FIG. 5A, for the optical filter implementations included in embodiments of lenses suitable for players in the outfield represented by the solid line, it is observed that (i) the value of the optical density for wavelengths in the vicinity of the third peak around 660 nm is about 400% higher as compared to the average value of the optical density for wavelengths in the third valley. Thus, wavelengths in the vicinity of the third peak around 660 nm are attenuated by about 400% more as compared to wavelengths in the vicinity of the third valley.

Referring to the effective absorbance profile, depicted in FIG. 5A, for the optical filter implementations included in embodiments of lenses suitable for players in the infield represented by the dashed line, it is observed that the first peak has a full width at half maximum (FWHM) of about 25-30 nm around a central wavelength of about 475 nm, the second peak has a full width at 90% maximum (FW90M) of about 10-15 nm around a central wavelength of about 575 nm and the third peak has a FWHM of about 20-25 nm around a central wavelength of about 660 nm.

Referring to the effective absorbance profile, depicted in FIG. 5A, for the optical filter implementations included in embodiments of lenses suitable for players in the infield represented by the dashed line, it is observed that (i) the value of the optical density for wavelengths in the vicinity of the first peak around 475 nm is about 320% higher as compared to the average value of the optical density for wavelengths in the first valley; (ii) the value of the optical density for wavelengths in the vicinity of the first peak around 475 nm is about 320% higher as compared to the average value of the optical density for wavelengths in the second valley. Thus, wavelengths in the vicinity of the first peak around 475 nm are attenuated by about 320% more as compared to wavelengths in the vicinity of the first and the second valley.

Referring to the effective absorbance profile, depicted in FIG. 5A, for the optical filter implementations included in embodiments of lenses suitable for players in the infield represented by the dashed line, it is observed that (i) the value of the optical density for wavelengths in the vicinity of the second peak around 575 nm is about 50% higher as compared to the average value of the optical density for wavelengths in the second valley; and (ii) the value of the optical density for wavelengths in the vicinity of the second peak around 575 nm is about 100% higher as compared to the average value of the optical density for wavelengths in the third valley. Thus, wavelengths in the vicinity of the second peak around 575 nm are attenuated by about 50% more as compared to wavelengths in the vicinity of the second valley and by about 100% more as compared to wavelengths in the vicinity of the third valley.

Referring to the effective absorbance profile, depicted in FIG. 5A, for the optical filter implementations included in embodiments of lenses suitable for players in the infield represented by the dashed line, it is observed that (i) the value of the optical density for wavelengths in the vicinity of the third peak around 660 nm is about 320% higher as compared to the average value of the optical density for wavelengths in the third valley. Thus, wavelengths in the vicinity of the third peak around 660 nm are attenuated by about 320% more as compared to wavelengths in the vicinity of the third valley.

Furthermore, the one or more filters included in the embodiment of the lens suitable for baseball players in the outfield and baseball player in the infield can be configured to attenuate light having wavelengths less than 400 nm (e.g., in the ultraviolet range). Thus, the embodiment of the lens suitable for baseball players in the outfield and baseball player in the infield can reduce the amount of ultraviolet light incident on the player's eyes thereby providing safety and health benefits.

Comparing the effective absorbance profiles of the implementations of optical filters configured for use by baseball players in the outfield and baseball players in the infield, it is noted that the optical filter implementation configured for use by baseball players in the infield absorb wavelengths around 475 nm (e.g., blue light) to a greater extent as compared to the optical filter implementations configured for use by baseball players in the outfield and absorb wavelengths around 575 nm (e.g., greenish-yellow light) and 660 nm (e.g., red light) to a lesser extent as compared to the optical filter implementations configured for use by baseball players in the outfield.

The attenuation factor of the absorbance peaks in the blue spectral region (e.g., between 440 nm and 490 nm) and red spectral region (e.g., between 620 nm and 670 nm) can be greater than or equal to about 0.8 and less than 1 in various implementations of optical filters configured for use by baseball players in the outfield and/or infield. Without any loss of generality, the attenuation factor of an absorbance peak can be obtained by dividing an integrated absorptance peak area within the spectral bandwidth by the spectral bandwidth of the absorbance peak.

As discussed above, the peaks in the effective absorbance profile corresponds to notches in the effective transmittance profile. The presence of notches in the effective transmittance profile creates distinct pass-bands. Wavelengths in each of the distinct pass-bands are transmitted with lower attenuation than wavelengths in the notches. In the illustrated transmission spectra in FIG. 5B, the effective transmittance profile of the optical filter implementations in an embodiment of the lens suitable for outfield players (represented by solid line) has a first pass-band configured to transmit between about 1% to about 40% of light in the violet-blue spectral ranges (e.g., between about 410 nm and about 460 nm); a second pass-band configured to transmit between about 1% and about 15% of the light in the green-yellow spectral ranges (e.g., between about 500 nm and about 560 nm); and a third pass-band configured to transmit between about 5% and about 40% of the light in the orange-red spectral ranges (e.g., between about 590 nm and about 640 nm).

In the illustrated transmittance profile in FIG. 5B, the effective transmittance profile of the optical filter implementations in an embodiment of the lens suitable for infield players (represented by dashed line) has a first pass-band configured to transmit between about 1% to about 30% of light in the violet-blue spectral ranges (e.g., between about 410 nm and about 460 nm); a second pass-band configured to transmit between about 1% and about 20% of the light in the green-yellow spectral ranges (e.g., between about 500 nm and about 560 nm); and a third pass-band configured to transmit between about 5% and about 30% of the light in the orange-red spectral ranges (e.g., between about 590 nm and about 640 nm).

Comparing the embodiments of the lenses for outfield players and infield players, it is noted that embodiments of lenses for outfield players are configured to transmit more light in the violet-blue spectral range and the orange-red spectral range as compared to embodiments of lenses for infield players. It is also noted that embodiments of lenses for outfield players are configured to transmit less light in the green-yellow spectral range as compared to embodiments of lenses for infield players.

It is further observed from FIG. 5B, that the second pass-band for embodiments of lenses for outfield and infield players has a substantially flat-top such that substantially all the wavelengths in the second pass-band are transmitted with almost equal intensity. In contrast, the first and third pass-bands for embodiments of lenses for outfield and infield players have a bell-shaped profile. It is observed from FIG. 5B that the FWHM of the first pass-band for embodiments of lenses for outfield players is about 30 nm around a central wavelength of about 425 nm; the FWHM of the second pass-band for embodiments of lenses for outfield players is about 80-90 nm around a central wavelength of about 530 nm; and the FWHM of the third pass-band for embodiments of lenses for outfield players is about 40 nm around a central wavelength of about 620 nm. It is further observed from FIG. 5B that the FWHM of the first pass-band for embodiments of lenses for infield players is about 25-35 nm around a central wavelength of about 420 nm; the FWHM of the second pass-band for embodiments of lenses for infield players is about 80-90 nm around a central wavelength of about 540 nm; and the FW90M of the third pass-band for embodiments of lenses for infield players is about 20 nm around a central wavelength of about 620 nm.

It is also observed from FIG. 5B that the effective transmittance profile for embodiments of lenses for outfield and infield players can transmit between about 80% and about 90% of light in the wavelength range between about 680 nm and about 790 nm.

FIG. 5C illustrates two effective relative absorption spectra of optical filter implementations that can be included in various embodiments of lenses suitable for baseball. The first effective relative absorbance profile represented by a solid line represents the effective relative absorbance profile of an implementation of an optical filter that can be included in an embodiment of a lens that is suitable for players in the outfield. The second effective relative absorbance profile represented by a dashed line represents the effective relative absorbance profile of an implementation of an optical filter that can be included in an embodiment of a lens that is suitable for players in the infield. As discussed above, the relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed from FIG. 5C that each of the relative absorbance profile has a similar profile as the corresponding absorbance profile depicted in FIG. 5A. As discussed above, in various embodiments the one or more filters can also be configured to provide tint or chromaticity (e.g., grey, brown, amber, yellow, etc.) to the lens embodiments that are suitable for infield and/or outfield players. For example, various implementations of lenses including implementations of optical filters that can be used for playing baseball can have a CIE chromaticity x value greater than or equal to about 0.35, greater than or equal to about 0.38, greater than or equal to about 0.4 and/or less than or equal to about 0.5. As another example, implementations of optical filters suitable for shooting can have a CIE chromaticity x value greater than or equal to about 0.37, greater than or equal to about 0.39, greater than or equal to about 0.42 and/or less than or equal to about 0.6.

As discussed above, the one or more embodiments that are suitable for infield and/or outfield players can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®.

C. Filters to Provide Color Enhancement for Snow Sports

Various embodiments of lenses used for viewing objects against snow or engaging in snow sports (e.g., skiing, snowboarding, sledding, snow shoeing etc.) preferably reduce glare (e.g., glare resulting from sunlight reflected from the snow). Reducing glare can advantageously increase the ability of seeing objects on the surface of the slope and thereby allow a snow sportsman to perform to the best of his/her ability. Accordingly, various embodiments of lenses used for snow sports can include coatings, layers or films that reduce glare. The glare reducing coatings, layers or films can include polarizing films and/or coatings to filter out polarized light, holographic or diffractive elements that are configured to reduce glare and/or diffusing elements. Additionally, it would be advantageous for various embodiments of lenses used for snow sports to include filters that make trees, sky and other objects (e.g., stones, boulders, tree roots, etc.) stand-out from the snow to enhance the experience of the snow sportsman. Making trees, sky and other objects (e.g., stones, boulders, tree roots, etc.) stand-out from the snow can also allow the snow sportsman to safely engage in the sporting activity of his/her choice. Additionally, since the lighting conditions can change on the slope, it would be advantageous to tailor different embodiments of lenses for different lighting conditions. For example, some embodiments of lenses for snow sports can be configured for viewing in bright light, such as on bright sunny days. As another example, some embodiments of lenses for snow sports can be configured for viewing in low light, such as on cloudy days. As yet another example, some embodiments of lenses for snow sports can be configured for viewing in bright as well as low light. Various embodiments of lenses suitable for snow sports can include one or more filters that transmit different colors in the visible spectral range with different values to create different viewing conditions. For example, some embodiments of lenses for snow sports can transmit all colors of the visible spectrum such that there is little distortion on bright sunny days. As another example, some embodiments of lenses for snow sports can transmit colors in the yellow and red spectral ranges and attenuate and/or absorb colors in the blue and green spectral ranges. Various embodiments of lenses used for snow sports can also be tinted (e.g., grey, green, amber, brown or yellow) to increase contrast between the snow and the sky and/or trees, reduce eye strain and/or for aesthetic purpose.

Figure 6A:
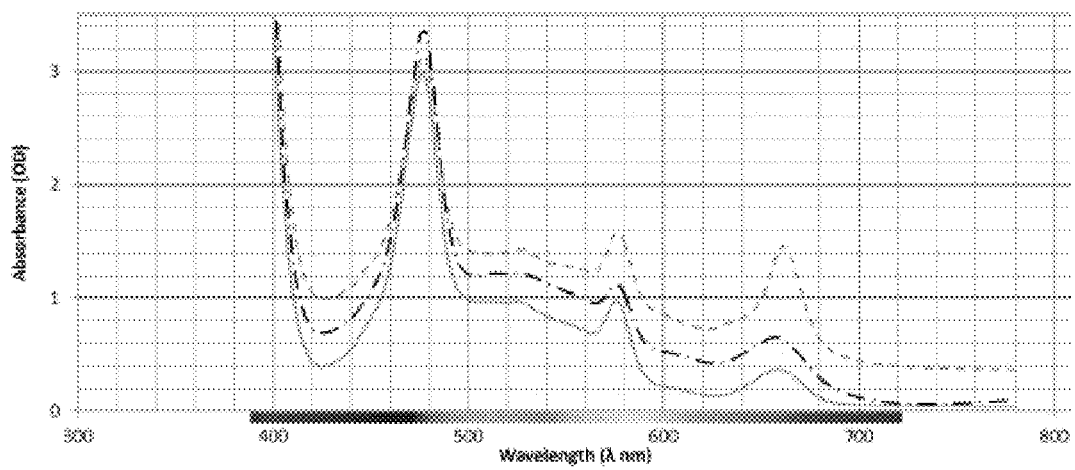
FIGS. 6A, 6B and 6C illustrate spectral characteristics of an implementation of optical filter that can be included in different embodiments of activity specific lenses.
Figure 6B:
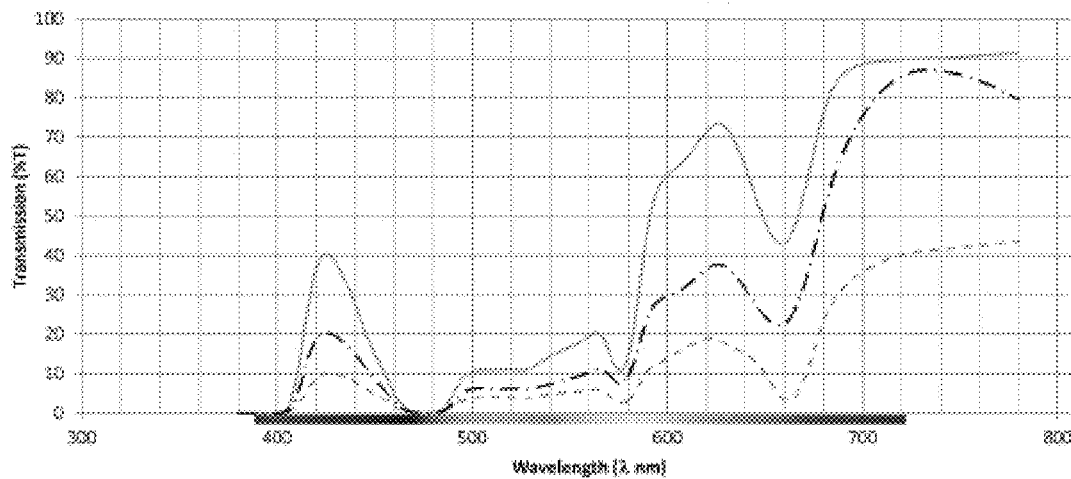
Figure 6C:
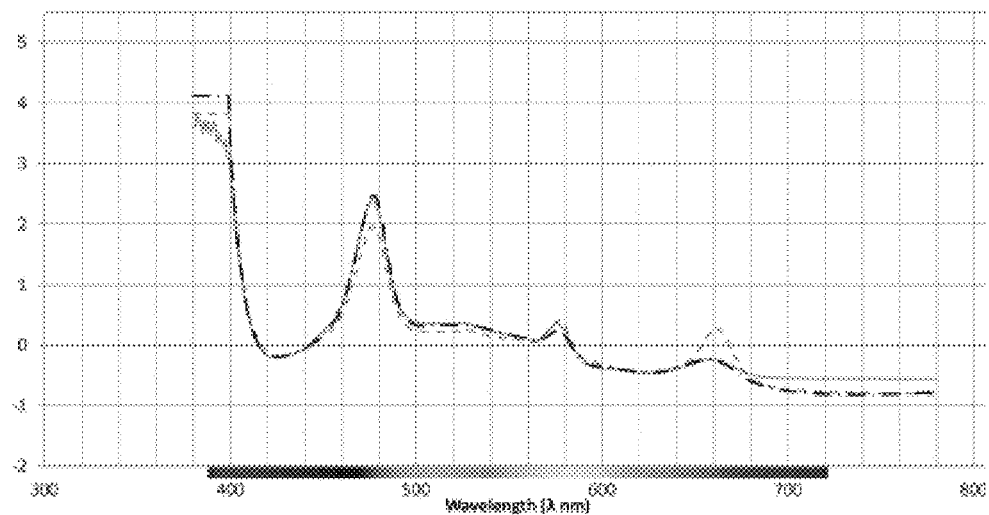

FIGS. 6A-6C illustrate the effective spectral response of implementations of optical filters that can be included in various embodiments of lenses suitable for snow sports. FIG. 6A illustrates three effective absorbance profiles of implementations of optical filters that can be included in various embodiments of lenses suitable for snow sports. The first effective absorbance profile represented by a solid line represents the effective absorbance profile of an optical filter implementation that can be included in an embodiment of a lens that is suitable for engaging in snow sports in low light. The second effective absorbance profile represented by a dashed line represents the effective absorbance profile of an optical filter implementation that can be included in an embodiment of a lens that is suitable for engaging in snow sports in bright light. The third effective absorbance profile represented by a dash-dot line represents the effective absorbance profile of an optical filter implementation that can be included in an embodiment of a lens that is suitable for engaging in snow sports in bright and/or low light.

FIG. 6B illustrates three effective transmittance profiles of an optical filter implementation that can be included in various embodiments of lenses suitable for snow sports. The first effective transmittance profile represented by a solid line represents the effective transmittance profile of an optical filter implementation that can be included in an embodiment of a lens that is suitable for engaging in snow sports in low light. The second effective transmittance profile represented by a dashed line represents the effective transmittance profile of an optical filter implementation that can be included in an embodiment of a lens that is suitable for engaging in snow sports in bright light. The third effective transmittance profile represented by a dash-dot line represents the effective transmittance profile of an optical filter implementation that can be included in an embodiment of a lens that is suitable for engaging in snow sports in bright and/or low light.

FIG. 6C illustrates three effective relative absorbance profiles of implementations of optical filters that can be included in various embodiments of lenses suitable for snow sports. The first effective relative absorbance profile represented by a solid line represents the effective relative absorbance of an optical filter implementation that can be included in an embodiment of a lens that is suitable for engaging in snow sports in low light. The second effective relative absorbance profile represented by a dashed line represents the effective relative absorbance profile of an optical filter implementation that can be included in an embodiment of a lens that is suitable for engaging in snow sports in bright light. The third effective relative absorbance profile represented by a dash-dot line represents the effective relative absorbance profile of an optical filter implementation that can be included in an embodiment of a lens that is suitable for engaging in snow sports in bright and/or low light.

As discussed above, the effective absorbance profile depicted in FIG. 6A exhibits peaks and valleys that correspond to the pass-bands and notches exhibited by the corresponding effective transmittance profile depicted in FIG. 6B.

Referring to FIG. 6A, the effective absorbance profiles for the implementations of optical filters included in embodiments of lenses suitable for engaging in snow sports in different lighting conditions each has a first peak between about 460 nm and 490 nm, a second peak between about 560 nm and 590 nm and a third peak between about 640 nm and 680 nm. The effective absorbance profile for the optical filter implementations included in embodiments of lenses suitable for engaging in snow sports in different lighting conditions each has a first valley in the wavelength range between about 410 nm and about 460 nm; a second valley in the wavelength range between about 500 nm and about 560 nm; and a third valley in the wavelength range between about 590 nm and about 640 nm. As discussed above, wavelengths in the first, second and third valleys have reduced absorbance as compared to the wavelengths in the vicinity of the first, second and third peaks.

Referring to the effective absorbance profile, depicted FIG. 6A, for the optical filter implementations included in embodiments of lenses suitable for engaging in snow sports in low light represented by the solid line, it is observed that the first peak has a full width at half maximum (FWHM) of about 25-30 nm around a central wavelength of about 475 nm, the second peak has a FW90M of about 10-15 nm around a central wavelength of about 575 nm and the third peak has a FW80M of about 25-30 nm around a central wavelength of about 660 nm.

Referring to the effective absorbance profile, depicted in FIG. 6A, for the optical filter implementations included in embodiments of lenses suitable for engaging in snow sports in low light represented by the solid line, it is observed that (i) the value of the optical density for wavelengths in the vicinity of the first peak around 475 nm is about 400% higher as compared to the average value of the optical density for wavelengths in the first valley; (ii) the value of the optical density for wavelengths in the vicinity of the first peak around 475 nm is about 250% higher as compared to the average value of the optical density for wavelengths in the second valley. Thus, wavelengths in the vicinity of the first peak around 475 nm are attenuated by about 400% more as compared to wavelengths in the vicinity of the first valley and by about 250% more as compared to wavelengths in the vicinity of the second valley.

Referring to the effective absorbance profile, depicted in FIG. 6A, for the optical filter implementations included in embodiments of lenses for engaging in snow sports in low light represented by the solid line, it is observed that (i) the value of the optical density for wavelengths in the vicinity of the second peak around 575 nm is about 0-10% higher as compared to the average value of the optical density for wavelengths in the second valley; and (ii) the value of the optical density for wavelengths in the vicinity of the second peak around 575 nm is about 350% higher as compared to the average value of the optical density for wavelengths in the third valley. Thus, wavelengths in the vicinity of the second peak around 575 nm are attenuated by about 0-10% more as compared to wavelengths in the vicinity of the second valley and by about 350% more as compared to wavelengths in the vicinity of the third valley.

Referring to the effective absorbance profile, depicted in FIG. 6A, for the optical filter implementations included in embodiments of lenses suitable for engaging in snow sports in low light represented by the solid line, it is observed that (i) the value of the optical density for wavelengths in the vicinity of the third peak around 660 nm is about 100% higher as compared to the average value of the optical density for wavelengths in the third valley. Thus, wavelengths in the vicinity of the third peak around 660 nm are attenuated by about 100% more as compared to wavelengths in the vicinity of the third valley.

Referring to the effective absorbance profile, depicted in FIG. 6A, for the optical filter implementations included in embodiments of lenses suitable for engaging in snow sports in bright light represented by the dashed line, it is observed that the first peak has a full width at half maximum (FWHM) of about 25-35 nm around a central wavelength of about 475 nm, the second peak has a FW90M of about 10-15 nm around a central wavelength of about 575 nm and the third peak has a FW80M of about 25-30 nm around a central wavelength of about 660 nm.

Referring to the effective absorbance profile, depicted in FIG. 6A, for the optical filter implementations included in embodiments of lenses suitable for engaging in snow sports in bright light represented by the dashed line, it is observed that (i) the value of the optical density for wavelengths in the vicinity of the first peak around 475 nm is about 200% higher as compared to the average value of the optical density for wavelengths in the first valley; (ii) the value of the optical density for wavelengths in the vicinity of the first peak around 475 nm is about 140% higher as compared to the average value of the optical density for wavelengths in the second valley. Thus, wavelengths in the vicinity of the first peak around 475 nm are attenuated by about 200% more as compared to wavelengths in the vicinity of the first valley and by about 140% more as compared to wavelengths in the vicinity of the second valley.

Referring to the effective absorbance profile, depicted in FIG. 6A, for the optical filter implementations included in embodiments of lenses for engaging in snow sports in bright light represented by the dashed line, it is observed that (i) the value of the optical density for wavelengths in the vicinity of the second peak around 575 nm is about 20-25% higher as compared to the average value of the optical density for wavelengths in the second valley; and (ii) the value of the optical density for wavelengths in the vicinity of the second peak around 575 nm is about 100% higher as compared to the average value of the optical density for wavelengths in the third valley. Thus, wavelengths in the vicinity of the second peak around 575 nm are attenuated by about 20-25% more as compared to wavelengths in the vicinity of the second valley and by about 100% more as compared to wavelengths in the vicinity of the third valley.

Referring to the effective absorbance profile, depicted in FIG. 6A, for the optical filter implementations included in embodiments of lenses suitable for engaging in snow sports in bright light represented by the dashed line, it is observed that (i) the value of the optical density for wavelengths in the vicinity of the third peak around 660 nm is about 100% higher as compared to the average value of the optical density for wavelengths in the third valley. Thus, wavelengths in the vicinity of the third peak around 660 nm are attenuated by about 100% more as compared to wavelengths in the vicinity of the third valley.

Referring to the effective absorbance profile, depicted in FIG. 6A, for the optical filter implementations included in embodiments of lenses suitable for engaging in snow sports in bright and/or low light represented by the dash-dot line, it is observed that the first peak has a full width at half maximum (FWHM) of about 25-35 nm around a central wavelength of about 475 nm, the second peak has a FW90M of about 10-15 nm around a central wavelength of about 575 nm and the third peak has a FW80M of about 25-30 nm around a central wavelength of about 660 nm.

Referring to the effective absorbance profile, depicted in FIG. 6A, for the optical filter implementations included in embodiments of lenses suitable for engaging in snow sports in bright and/or low light represented by the dash-dot line, it is observed that (i) the value of the optical density for wavelengths in the vicinity of the first peak around 475 nm is about 350% higher as compared to the average value of the optical density for wavelengths in the first valley; (ii) the value of the optical density for wavelengths in the vicinity of the first peak around 475 nm is about 200% higher as compared to the average value of the optical density for wavelengths in the second valley. Thus, wavelengths in the vicinity of the first peak around 475 nm are attenuated by about 350% more as compared to wavelengths in the vicinity of the first valley and by about 200% more as compared to wavelengths in the vicinity of the second valley.

Referring to the effective absorbance profile, depicted in FIG. 6A, for the optical filter implementations included in embodiments of lenses for engaging in snow sports in bright and/or low light represented by the dash-dot line, it is observed that (i) the value of the optical density for wavelengths in the vicinity of the second peak around 575 nm is about 0-10% higher as compared to the average value of the optical density for wavelengths in the second valley; and (ii) the value of the optical density for wavelengths in the vicinity of the second peak around 575 nm is about 100% higher as compared to the average value of the optical density for wavelengths in the third valley. Thus, wavelengths in the vicinity of the second peak around 575 nm are attenuated by about 0-10% more as compared to wavelengths in the vicinity of the second valley and by about 100% more as compared to wavelengths in the vicinity of the third valley.

Referring to the effective absorbance profile, depicted in FIG. 6A, for the optical filter implementations included in embodiments of lenses suitable for engaging in snow sports in bright and/or low light represented by the dash-dot line, it is observed that (i) the value of the optical density for wavelengths in the vicinity of the third peak around 660 nm is about 20% higher as compared to the average value of the optical density for wavelengths in the third valley. Thus, wavelengths in the vicinity of the third peak around 660 nm are attenuated by about 20% more as compared to wavelengths in the vicinity of the third valley.

Furthermore, the optical filter implementations included in the embodiment of the lens suitable for engaging in snow sports in different lighting conditions can be configured to attenuate light having wavelengths less than 400 nm (e.g., in the ultraviolet range). Thus, the embodiment of the lens suitable for engaging in snow sports in different lighting conditions can reduce the amount of ultraviolet light incident on the player's eyes thereby providing safety and health benefits.

Comparing the effective absorbance profiles of optical filter implementations configured for engaging in snow sports in different lighting conditions, it is noted that the one or more filters configured for use in low light absorb wavelengths around 475 nm (e.g., blue light), wavelengths around 575 nm (e.g., yellow-green light) and wavelengths around 660 nm (e.g., red light) to a lesser extent as compared to the one or more filters configured for use in bright line and bright and/or low light. It is further noted that the optical filter implementations configured for use in bright and/or low light absorb wavelengths around 475 nm (e.g., blue light) to a greater extent as compared to the one or more filters configured for use in bright light and absorb wavelengths around 575 nm (e.g., greenish-yellow light) and 660 nm (e.g., red light) to a lesser extent as compared to the one or more filters configured for use in bright light.

The attenuation factor of the absorbance peaks in the blue spectral regions (e.g., between about 450 nm and about 490 nm) and green spectral region (e.g., between about 550 nm and about 590 nm) can be greater than or equal to about 0.8 and less than 1 in various implementations of optical filters adapted to view objects against snow. The attenuation factor of the absorbance peaks in the red spectral region (e.g., between about 630 nm and about 670 nm) can be between about 0.5 and 0.8 in various implementations of optical filters adapted to view objects against snow.

As discussed above, the peaks in the effective absorbance profile corresponds to notches in the effective transmittance profile. The presence of notches in the effective transmittance profile creates distinct pass-bands. Wavelengths in each of the distinct pass-bands are transmitted with lower attenuation than wavelengths in the notches. In the transmittance profiles illustrated in FIG. 6B, the effective transmittance profile of the implementation of optical filter in an embodiment of the lens suitable for engaging in snow sports in low light (represented by solid line) has a first pass-band configured to transmit between about 1% to about 40% of light in the violet-blue spectral ranges (e.g., between about 410 nm and about 460 nm); a second pass-band configured to transmit between about 1% and about 20% of the light in the green-yellow spectral ranges (e.g., between about 490 nm and about 560 nm); and a third pass-band configured to transmit between about 10% and about 75% of the light in the orange-red spectral ranges (e.g., between about 590 nm and about 650 nm).

In the transmittance profiles illustrated in FIG. 6B, the effective transmittance profile of the implementation of optical filter included in an embodiment of the lens suitable for engaging in snow sports in bright light (represented by dashed line) has a first pass-band configured to transmit between about 1% to about 10% of light in the violet-blue spectral ranges (e.g., between about 405 nm and about 460 nm); a second pass-band configured to transmit between about 1% and about 5% of the light in the green-yellow spectral ranges (e.g., between about 490 nm and about 570 nm); and a third pass-band configured to transmit between about 5% and about 20% of the light in the orange-red spectral ranges (e.g., between about 580 nm and about 650 nm).

In the transmittance profiles illustrated in FIG. 6B, the effective transmittance profile of the implementation of optical filter included in an embodiment of the lens suitable for engaging in snow sports in bright and/or low light (represented by dash-dot line) has a first pass-band configured to transmit between about 1% to about 20% of light in the violet-blue spectral ranges (e.g., between about 405 nm and about 460 nm); a second pass-band configured to transmit between about 1% and about 10% of the light in the green-yellow spectral ranges (e.g., between about 490 nm and about 570 nm); and a third pass-band configured to transmit between about 5% and about 40% of the light in the orange-red spectral ranges (e.g., between about 580 nm and about 650 nm).

Comparing the embodiments of the lenses for engaging in snow sports in low light, bright light and bright and/or low light, it is noted that embodiments of lenses configured for engaging in snow sports in low light transmit more light as compared to embodiments of lenses configured for engaging in snow sports in bright light and bright and/or low light so as to allow the snow sportsman to see clearly in low light. It is further noted that embodiments of lenses configured for engaging in snow sports in bright light alone transmit less light as compared to embodiments of lenses configured for engaging in snow sports in bright and/or low light transmit so as to reduce the overall brightness and strain on the eyes.

It is further observed from FIG. 6B that the second pass-band for embodiments of lenses for engaging in snow sports in different lighting conditions have a plateau shaped region between about 490 nm and about 530 nm such that substantially all the wavelengths in the wavelength between about 490 nm and about 530 nm are transmitted with almost equal intensity. In contrast, the first and third pass-bands for embodiments of lenses for engaging in snow sports in different lighting conditions have a bell-shaped profile. It is observed from FIG. 6B that the FWHM of the first pass-band for embodiments of lenses for engaging in snow sports in low light (represented by solid line) is about 30 nm around a central wavelength of about 425 nm; and the FW80M of the third pass-band for embodiments of lenses for engaging in snow sports in low light is about 40-50 nm around a central wavelength of about 630 nm.

It is further observed from FIG. 6B that that the FWHM of the first pass-band for embodiments of lenses for engaging in snow sports in bright light (represented by dashed line) is about 30 nm around a central wavelength of about 425 nm; and the FWHM of the third pass-band for embodiments of lenses for engaging in snow sports in bright light is about 60-70 nm around a central wavelength of about 620 nm.

It is further observed from FIG. 6B that that the FWHM of the first pass-band for embodiments of lenses for engaging in snow sports in bright and/or low light (represented by dash-dot line) is about 30 nm around a central wavelength of about 425 nm; and the FW80M of the third pass-band for embodiments of lenses for engaging in snow sports in bright light and/or low light is about 40-50 nm around a central wavelength of about 620 nm.

It is also observed from FIG. 6B that the effective transmittance profile for embodiments of lenses for engaging in snow sports in different lighting conditions can transmit between about 80% and about 90% of light in the wavelength range between about 680 nm and about 790 nm.

FIG. 6C illustrates three effective relative absorbance profiles of optical filter implementations that can be included in various embodiments of lenses that are suitable for engaging in snow sports. As discussed above, the relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed from FIG. 6C that each of the relative absorbance profile has a similar profile as the corresponding absorbance profile depicted in FIG. 6A.

Comparing the relative absorbance for different embodiments of lenses for engaging in snow sports in different lighting conditions, it is noted that the embodiments of lenses configured for engaging in snow sports in bright light absorb wavelengths around red light to a greater extent as compared to embodiments of lenses configured for engaging in snow sports in low or bright and/or low light. Furthermore, the embodiments of lenses configured for engaging in snow sports in bright light absorb wavelengths around blue light to a lesser extent as compared to embodiments of lenses configured for engaging in snow sports in low or bright and/or low light. As discussed above, in various embodiments of lenses including optical filters suitable for viewing objects against snow can be tinted or have a chromaticity (e.g., pink, orange, red, brown, amber, yellow, etc.). For example, embodiments of lenses including optical filters that are adapted to view objects against snow can have a CIE chromaticity x value of 0.35 or greater and a CIE chromaticity y value of 0.35. Various embodiments of lenses including optical filters that are adapted to view objects against snow can have a CIE chromaticity x value greater than or equal to about 0.35, greater than or equal to about 0.38, greater than or equal to about 0.4 and/or less than or equal to about 0.5. As another example, implementations of optical filters suitable for shooting can have a CIE chromaticity x value greater than or equal to about 0.37, greater than or equal to about 0.39, greater than or equal to about 0.42 and/or less than or equal to about 0.6. Various embodiments of lenses including optical filters that are adapted to view objects against snow can have a CIE chromaticity y value between about 0.4 and about 0.5.

The embodiments of lenses including implementations of optical filters that are suitable for engaging in snow sports in bright light and/or bright and/or low light can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®.

D. Filters to Provide Color Enhancement for Golf

Viewing a golf ball's trajectory and determining its location are important to golfers of various skill levels. Trajectories of a golf ball hit by an inexperienced golfer are unpredictable and frequently place the ball in locations in which the ball is hard to find. Such failures to promptly find a golf ball can increase the time used to play a round and can reduce the number of rounds that can be played on a course in a day. Because time spent looking for errant golf balls contributes to slow play, many courses and many tournaments have rules concerning how long a golfer is permitted to search for a lost golf ball before putting a replacement ball into play. For more experienced or expert golfers, loss of a golf ball results in imposition of a penalty that adds strokes to the golfer's score. Such penalty strokes are annoying, especially when the loss of a ball results from an inability to find the ball due to poor viewing conditions and a limited time in which to search. Moreover, the ability to visually discern various textures, tones and topography of the grass can be important to enhance a golfer's game. Accordingly, embodiments of lenses including chroma-enhancing optical filters that enhance a golfers ability to see the golf ball against the grass and see other obstacles and markers on the golf course are advantageous.

Various embodiments of lenses used for golf preferably reduce glare (e.g., glare resulting from sunlight on a bright sunny day). Reducing glare can advantageously increase the ability of seeing the fairway, the hole and the ball thus allowing a golfer to play to the best of his/her ability. Accordingly, various embodiments of lenses used for golf can include coatings, layers or films that reduce glare. The glare reducing coatings, layers or films can include polarizing films and/or coatings to filter out polarized light, holographic or diffractive elements that are configured to reduce glare and/or diffusing elements. Additionally, it would be advantageous for various embodiments of lenses used for golf to include filters that make trees, sky and other objects (e.g., flags, water features, tree roots, etc.) stand-out from the green grass to aid the golfer to guide the golf ball to a desired location. Making trees, sky and other objects stand-out from the green grass can also enhance a players golfing experience.

Various embodiments of lenses suitable for golfing can include implementations of optical filters that transmit different colors in the visible spectral range with different values to create different viewing conditions. For example, some embodiments of lenses for golfing can transmit all colors of the visible spectrum such that there is little distortion on bright sunny days. As another example, some embodiments of lenses for golfing can transmit colors in the yellow and red spectral ranges and attenuate and/or absorb colors in the blue and green spectral ranges. Various embodiments of lenses used for golfing can also be tinted (e.g., grey, green, amber, brown or yellow) to increase contrast between the grass and the sky, reduce eye strain and/or for aesthetic purpose.

Figure 7A:
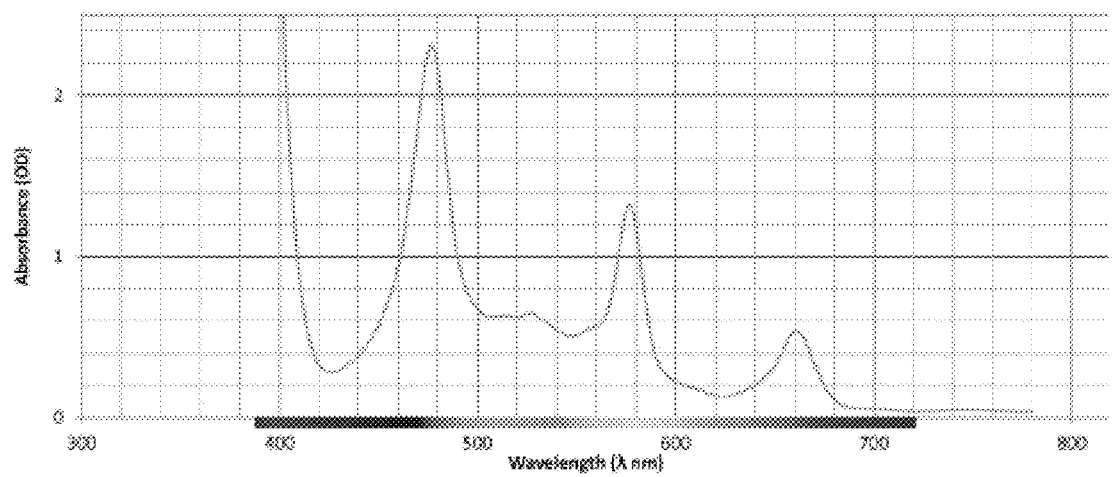
FIGS. 7A, 7B and 7C illustrate spectral characteristics of an implementation of optical filter that can be included in different embodiments of activity specific lenses.
Figure 7B:
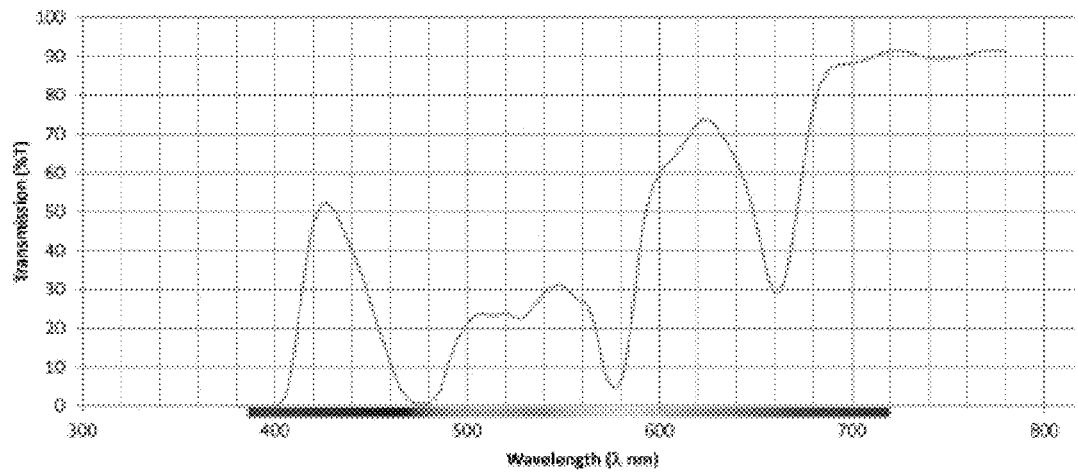
Figure 7C:
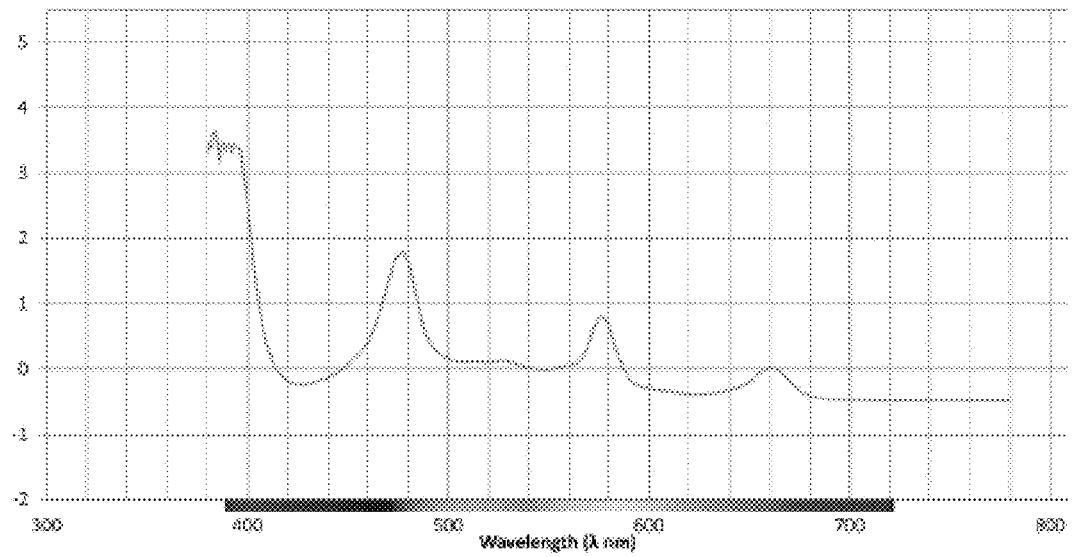

FIGS. 7A-7C illustrate the effective spectral response of an optical filter implementation that can be included in an embodiment of a lens that is suitable for golfing. FIG. 7A illustrates the effective absorbance profile of the optical filter implementation that can be included in an embodiment of a lens that is suitable for golfing. FIGS. 7B and 7C show the effective transmittance profile and the relative absorbance profile of the same optical filter implementation.

Referring to FIG. 7A, it is observed that the effective absorbance profile for the one or more lenses included in an embodiment of a lens that is suitable for golfing has a first "valley" in the wavelength range between about 410 nm and about 460 nm; a second "valley" in the wavelength range between about 500 nm and about 560 nm; and a third "valley" in the wavelength range between about 600 nm and about 700 nm. Wavelengths in the first, second and third valleys have reduced absorbance as compared to the wavelengths in the vicinity of the first and second peaks. The valleys in the absorbance profile correspond to the passbands in the transmittance profile. It is noted from FIG. 7A that the first peak has a FWHM of about 25-30 nm around a central wavelength of about 475 nm, the second peak has a FW80M of about 10-20 nm around a central wavelength of about 575 nm and the third peak has a FW80M of about 15-20 nm around a central wavelength of about 660 nm.

It is observed from FIG. 7A that (i) the value of the optical density for wavelengths in the vicinity of the first peak around 475 nm is about 300-400% higher as compared to the average value of the optical density for wavelengths in the first valley; and (ii) the value of the optical density for wavelengths in the vicinity of the first peak around 475 nm is about 300% higher as compared to the average value of the optical density for wavelengths in the second valley. Thus, wavelengths in the vicinity of the first peak around 475 nm are attenuated by about 300-400% more as compared to wavelengths in the vicinity of the first valley and by about 300% more as compared to wavelengths in the vicinity of the second valley.

It is further observed from FIG. 7A that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 500% higher as compared to the average value of the optical density for wavelengths in the third valley. Thus, wavelengths in the vicinity of the second peak around 575 nm are attenuated by about 100% more as compared to wavelengths in the vicinity of the second valley and by about 500% more as compared to wavelengths in the vicinity of the third valley.

It is further observed from FIG. 7A that (i) the value of the optical density for wavelengths in the vicinity of the third peak around 660 nm is about 100% higher as compared to the average value of the optical density for wavelengths in the third valley. Thus, wavelengths in the vicinity of the third peak around 660 nm are attenuated by about 100% more as compared to wavelengths in the vicinity of the third valley.

In various embodiments of lenses the implementation of an optical filter configured for use for golfing can be adapted to attenuate light having wavelengths less than 400 nm thereby providing safety and health benefits. Furthermore, the attenuation factor of the absorbance peaks in the blue spectral range (e.g., between about 450 nm and about 490 nm) and green spectral range (e.g., between about 550 nm and about 590 nm) can be greater than or equal to about 0.8 and less than 1 in various implementations of optical filters adapted for golfing. Additionally, the attenuation factor of the absorbance peaks in the red spectral range (e.g., between about 620 nm and about 660 nm) can be between about 0.5 and about 0.8 in various implementations of optical filters adapted for golfing. Without any loss of generality, the attenuation factor of an absorbance peak can be obtained by dividing an integrated absorptance peak area within the spectral bandwidth by the spectral bandwidth of the absorbance peak.

In the illustrated transmittance profile in FIG. 7B, the effective transmittance profile of the optical filter implementation has a first pass-band configured to transmit between about 1% to about 50% of light in the violet-blue spectral ranges (e.g., between about 405 nm and about 470 nm); a second pass-band configured to transmit between about 1% and about 30% of the light in the green-yellow spectral ranges (e.g., between about 490 nm and about 570 nm); and a third pass-band configured to transmit between about 10% and about 75% of the light in the orange-red spectral ranges (e.g., between about 580 nm and about 660 nm).

It is further observed from FIG. 7B that the second pass-band for an embodiment of a lens suitable for golfing has a plateau shaped region between about 490 nm and about 530 nm such that substantially all the wavelengths in the wavelength range between about 490 nm and about 530 nm are transmitted with almost equal intensity. In contrast, the first and third pass-bands for an embodiment of a lens for golfing have a bell-shaped profile. It is observed from FIG. 7B that the FWHM of the first pass-band for an embodiment of a lens for golfing is about 35 nm around a central wavelength of about 425 nm; and the FWHM of the third pass-band for embodiments of lenses for an embodiment of a lens for golfing is about 50-60 nm around a central wavelength of about 625 nm.

It is also observed from FIG. 7B that the effective transmittance profile for an embodiment of a lens suitable for golfing can transmit between about 80% and about 90% of light in the wavelength range between about 680 nm and about 790 nm.

FIG. 7C illustrates the effective relative absorbance profile of an embodiment of a lens including an optical filter implementation that can be suitable for golfing. The relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed that the relative absorption has a similar profile as the absorbance profile depicted in FIG. 7A. In various embodiments the optical filter implementations can also be configured to provide a tint or chromaticity (e.g., orange, red, pink, brown, amber, yellow, etc.) to the lens embodiments that are suitable for golfing. In various embodiments, the implementations of optical filters suitable for golfing can have a CIE chromaticity x value of 0.35 or greater. For example, implementations of optical filters suitable for golfing can have a CIE chromaticity x value greater than or equal to about 0.35, greater than or equal to about 0.38, greater than or equal to about 0.4 and/or less than or equal to about 0.5. As another example, implementations of optical filters suitable for shooting can have a CIE chromaticity x value greater than or equal to about 0.37, greater than or equal to about 0.39, greater than or equal to about 0.42 and/or less than or equal to about 0.6.

The embodiments of lenses including implementations of optical filters that are suitable for golfing can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®.

E. Filters to Provide Color Enhancement for Shooting

Various embodiments of lenses used for shooting (e.g., target shooting, hunting, etc.) preferably reduce glare (e.g., glare resulting from sunlight on a bright sunny day). Reducing glare can advantageously increase the ability of the shooter to see the target clearly. Accordingly, various embodiments of lenses used for shooting can include coatings, layers or films that reduce glare. The glare reducing coatings, layers or films can include polarizing films and/or coatings to filter out polarized light, holographic or diffractive elements that are configured to reduce glare and/or diffusing elements. Additionally, since the lighting conditions can change depending on the day, it would be advantageous to tailor different embodiments of lenses for shooting for different lighting conditions. For example, some embodiments of lenses for shooting can be configured for viewing in bright light, such as on bright sunny days. As another example, some embodiments of lenses for shooting can be configured for viewing in low light, such as on cloudy days. Various embodiments of lenses suitable for shooting can include implementations of optical filters that transmit different colors in the visible spectral range with different values to create different viewing conditions. For example, some embodiments of lenses suitable for shooting can transmit all colors of the visible spectrum such that there is little distortion on bright sunny days. As another example, some embodiments of lenses suitable for shooting can transmit colors in the yellow and red spectral ranges and attenuate and/or absorb colors in the blue and green spectral ranges. Various embodiments of lenses used for shooting can also be tinted (e.g., grey, green, amber, brown or yellow) to increase contrast between the target and the trees, reduce eye strain and/or for aesthetic purpose.

Figure 8A:
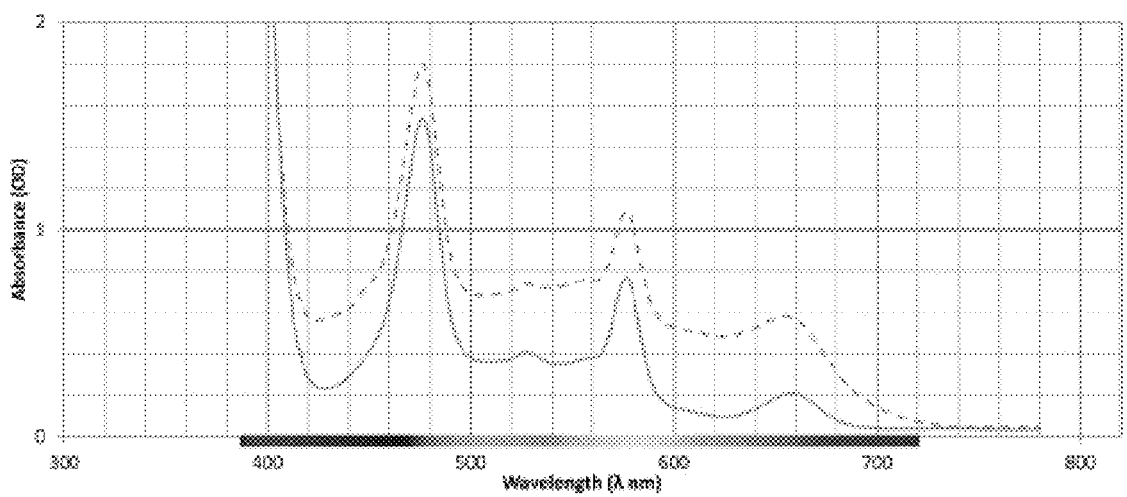
FIGS. 8A, 8B and 8C illustrate spectral characteristics of an implementation of optical filter that can be included in different embodiments of activity specific lenses.
Figure 8B:
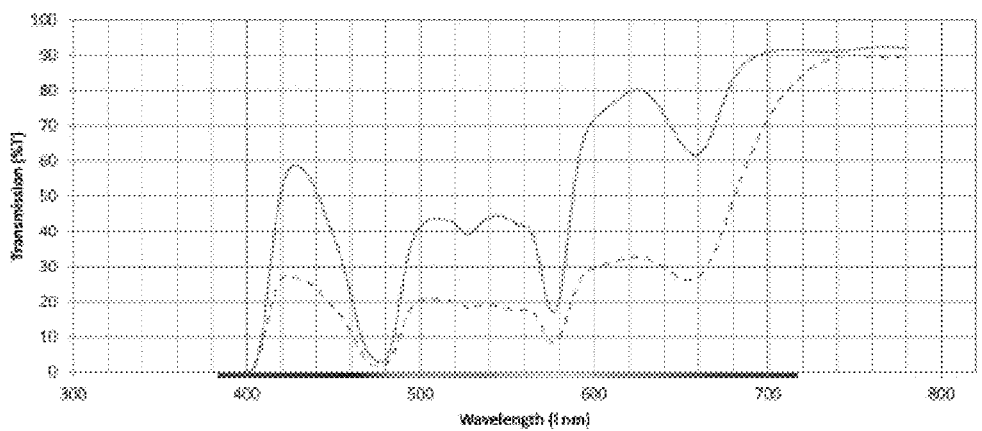
Figure 8C:
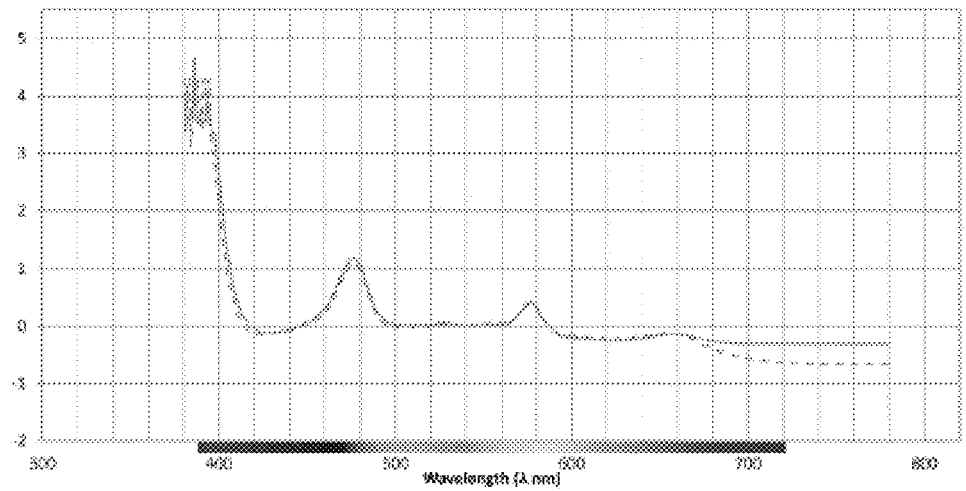

FIGS. 8A-8C illustrate the effective spectral response of implementations of optical filters that can be included in various embodiments of lenses suitable for shooting. FIG. 8A illustrates two effective absorbance profiles of optical filter implementations that can be included in various embodiments of lenses suitable for shooting. The first effective absorbance profile represented by a solid line represents the effective absorbance profile of an optical filter implementation that can be included in an embodiment of a lens that is suitable for engaging in shooting in low light. The second effective absorbance profile represented by a dashed line represents the effective absorbance profile of an optical filter implementation that can be included in an embodiment of a lens that is suitable for engaging in shooting in bright light. FIG. 8B illustrates two effective transmittance profiles of the same optical filter implementations that can be included in various embodiments of lenses suitable for shooting. The first effective transmittance profile represented by a solid line represents the effective transmittance profile of the same optical filter implementation that can be included in an embodiment of a lens that is suitable for shooting in low light. The second effective transmittance profile represented by a dashed line represents the effective transmittance profile of the same optical filter implementation that can be included in an embodiment of a lens that is suitable for shooting in bright. FIG. 8C illustrates two effective relative absorbance profiles of the same optical filter implementations that can be included in various embodiments of lenses suitable for shooting. The first relative absorbance profile represented by a solid line represents the effective relative absorbance profile of the same optical filter implementation that can be included in an embodiment of a lens that is suitable for shooting in low light. The second effective relative absorbance profile represented by a dashed line represents the effective relative absorbance profile of the same optical filter implementation that can be included in an embodiment of a lens that is suitable for shooting in bright light.

As discussed above, the effective absorbance profile depicted in FIG. 8A exhibits peaks and valleys that correspond to the pass-bands and notches exhibited by the corresponding effective transmittance profile depicted in FIG. 8B.

Referring to FIG. 8A, the effective absorbance profiles for the optical filter implementations included in embodiments of lenses suitable for shooting in different lighting conditions each has a first peak between about 460 nm and 490 nm and a second peak between about 560 nm and 590 nm. The effective absorbance profile for the optical filter implementations included in embodiments of lenses suitable for shooting in different lighting conditions each has a first valley in the wavelength range between about 410 nm and about 460 nm; a second valley in the wavelength range between about 500 nm and about 560 nm; and a third valley in the wavelength range between about 590 nm and about 640 nm. As discussed above, wavelengths in the first, second and third valleys have reduced absorbance as compared to the wavelengths in the vicinity of the first and second peaks.

Referring to the effective absorbance profile, depicted in FIG. 8A, for the implementations of optical filters included in embodiments of lenses suitable for shooting in low light represented by the solid line, it is observed that the first peak has a full width at half maximum (FWHM) of about 25-30 nm around a central wavelength of about 475 nm and the second peak has a FW80M of about 10-15 nm around a central wavelength of about 575 nm.

Referring to the effective absorbance profile, depicted in FIG. 8A, for the implementations of optical filters included in embodiments of lenses suitable for shooting in low light represented by the solid line, it is observed that (i) the value of the optical density for wavelengths in the vicinity of the first peak around 475 nm is about 200% higher as compared to the average value of the optical density for wavelengths in the first valley; (ii) the value of the optical density for wavelengths in the vicinity of the first peak around 475 nm is about 200% higher as compared to the average value of the optical density for wavelengths in the second valley. Thus, wavelengths in the vicinity of the first peak around 475 nm are attenuated by about 200% more as compared to wavelengths in the vicinity of the first valley and the second valley.

Referring to the effective absorbance profile, depicted in FIG. 8A, for the implementation of the optical filter included in embodiments of lenses suitable for shooting in low light represented by the solid line, it is observed that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 500-600% higher as compared to the average value of the optical density for wavelengths in the third valley. Thus, wavelengths in the vicinity of the second peak around 575 nm are attenuated by about 100% more as compared to wavelengths in the vicinity of the second valley and by about 500-600% more as compared to wavelengths in the vicinity of the third valley.

Referring to the effective absorbance profile, depicted in FIG. 8A, for the optical filter implementations included in embodiments of lenses suitable for shooting in bright light represented by the dashed line, it is observed that the first peak has a full width at half maximum (FWHM) of about 30-35 nm around a central wavelength of about 475 nm, the second peak has a full width at 90% maximum (FW90M) of about 10-15 nm around a central wavelength of about 575 nm.

Referring to the effective absorbance profile, depicted in FIG. 8A, for the implementation of the optical filter included in embodiments of lenses suitable for shooting in bright light represented by the dashed line, it is observed that (i) the value of the optical density for wavelengths in the vicinity of the first peak around 475 nm is about 150% higher as compared to the average value of the optical density for wavelengths in the first valley; (ii) the value of the optical density for wavelengths in the vicinity of the first peak around 475 nm is about 150% higher as compared to the average value of the optical density for wavelengths in the second valley. Thus, wavelengths in the vicinity of the first peak around 475 nm are attenuated by about 150% more as compared to wavelengths in the vicinity of the first and the second valley.

Referring to the effective absorbance profile, depicted in FIG. 8A, for the implementation of the optical filter included in embodiments of lenses suitable for shooting in bright light represented by the dashed line, it is observed that (i) the value of the optical density for wavelengths in the vicinity of the second peak around 575 nm is about 40% higher as compared to the average value of the optical density for wavelengths in the second valley; and (ii) the value of the optical density for wavelengths in the vicinity of the second peak around 575 nm is about 100% higher as compared to the average value of the optical density for wavelengths in the third valley. Thus, wavelengths in the vicinity of the second peak around 575 nm are attenuated by about 40% more as compared to wavelengths in the vicinity of the second valley and by about 100% more as compared to wavelengths in the vicinity of the third valley.

The attenuation factor of the absorbance peaks in the blue spectral range (e.g., between about 450 nm and about 490 nm) and green spectral regions (e.g., between about 550 nm and 590 nm) can be greater than or equal to about 0.8 and less than 1 in various implementations of optical filters adapted for shooting. The attenuation factor of the absorbance peaks in the red spectral range (e.g., between about 630 nm and about 660 nm) can be between about 0.4 and about 0.8 in various implementations of optical filters adapted for shooting. Without any loss of generality, the attenuation factor of an absorbance peak can be obtained by dividing an integrated absorptance peak area within the spectral bandwidth by the spectral bandwidth of the absorbance peak.

Furthermore, the implementations of optical filters included in the embodiment of the lens suitable for shooting in different lighting conditions can be configured to attenuate light having wavelengths less than 400 nm (e.g., in the ultraviolet range) thereby providing safety and health benefits.

As discussed above, the peaks in the effective absorbance profile corresponds to notches in the effective transmittance profile. The presence of notches in the effective transmittance profile creates distinct pass-bands. Wavelengths in each of the distinct pass-bands are transmitted with lower attenuation than wavelengths in the notches. In the transmittance profile illustrated in FIG. 8B, the effective transmittance profile of the one or more filters in an embodiment of the lens suitable for engaging in shooting in low light (represented by a solid line) has a first pass-band configured to transmit between about 1% to about 60% of light in the violet-blue spectral ranges (e.g., between about 405 nm and about 460 nm); a second pass-band configured to transmit between about 5% and about 45% of the light in the green-yellow spectral ranges (e.g., between about 490 nm and about 570 nm); and a third pass-band configured to transmit between about 20% and about 80% of the light in the orange-red spectral ranges (e.g., between about 580 nm and about 650 nm).

In the transmittance profile illustrated in FIG. 8B, the effective transmittance profile of the implementation of optical filter in an embodiment of the lens suitable for engaging in shooting in bright light (represented by a dashed line) has a first pass-band configured to transmit between about 1% to about 30% of light in the violet-blue spectral ranges (e.g., between about 405 nm and about 460 nm); a second pass-band configured to transmit between about 1% and about 20% of the light in the green-yellow spectral ranges (e.g., between about 490 nm and about 570 nm); and a third pass-band configured to transmit between about 10% and about 35% of the light in the orange-red spectral ranges (e.g., between about 580 nm and about 650 nm).

Comparing the embodiments of the lenses for engaging in shooting in low light and, bright light, it is noted that embodiments of lenses configured for engaging in shooting in low light transmit more light as compared to embodiments of lenses configured for engaging in shooting in bright light so as to allow the shooter to see clearly in low light. Transmitting less light in bright conditions can also advantageously reduce the overall strain on the eyes in bright conditions.

It is further observed from FIG. 8B that the second pass-band for embodiments of lenses for engaging in shooting in different lighting conditions have a plateau shaped region between about 490 nm and about 560 nm such that substantially all the wavelengths in the wavelength between about 490 nm and about 560 nm are transmitted with almost equal intensity. In contrast, the first and third pass-bands for embodiments of lenses for engaging in shooting in different lighting conditions have a bell-shaped profile. It is observed from FIG. 8B that the FWHM of the first pass-band for embodiments of lenses for engaging in shooting in low light is about 40-50 nm around a central wavelength of about 425 nm; and the FW90M of the third pass-band for embodiments of lenses for engaging in shooting in low light is about 40-50 nm around a central wavelength of about 620 nm.

It is further observed from FIG. 8B that that the FWHM of the first pass-band for embodiments of lenses for engaging in shooting in bright light is about 40-50 nm around a central wavelength of about 425 nm; and the FW90M of the third pass-band for embodiments of lenses for engaging in shooting in bright light is about 40-50 nm around a central wavelength of about 620 nm.

It is also observed from FIG. 8B that the effective transmittance profile for embodiments of lenses engaging in shooting in different lighting conditions can transmit between about 80% and about 90% of light in the wavelength range between about 680 nm and about 790 nm.

FIG. 8C illustrates two effective relative absorbance profiles of implementations of an optical filter that can be included in various embodiments of a lens that configured for engaging in shooting under different lighting conditions. As discussed above, the relative absorbance profile is obtained by plotting the term $-\log_{10}(\% \, T_\lambda / \tau_v)$ with respect to the wavelength ($\lambda$). The factor % $T_\lambda$ represents the percentage of light transmitted through the optical filter implementations at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed from FIG. 8C that each of the relative absorbance profile has a similar profile as the corresponding absorbance profile depicted in FIG. 8A. In various embodiments the optical filter implementations can also be configured to provide a tint or chromaticity (e.g., orange, red, pink, brown, amber, yellow, etc.) to the lens embodiments that are suitable for shooting. In various embodiments, the implementations of optical filters suitable for shooting can have a CIE chromaticity x value of 0.35 or greater. For example, implementations of optical filters suitable for shooting can have a CIE chromaticity x value greater than or equal to about 0.35, greater than or equal to about 0.38, greater than or equal to about 0.4 and/or less than or equal to about 0.5. As another example, implementations of optical filters suitable for shooting can have a CIE chromaticity x value greater than or equal to about 0.37, greater than or equal to about 0.39, greater than or equal to about 0.42 and/or less than or equal to about 0.6.

The embodiments of lenses including implementations of optical filters that are suitable for shooting can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®.

CONCLUSION

The implementations of optical filters described above can be categorized into three categories: (a) adapted to view objects on the surface of water or underwater; (b) adapted to view objects on grass; and (c) adapted to view objects on snow. The characteristic of optical filters in each of the categories are summarized in the table below:

| | Position of the first absorbance peak | | Position of the second absorbance peak | | Position of the third absorbance peak | | Chromaticity [x, y] |
|---|---|---|---|---|---|---|---|
| | Range | Attenuation Factor | Range | Attenuation Factor | Range | Attenuation Factor | |
| Water | 450 nm-490 nm | >0.8; <1.0 | 550 nm-590 nm | >0.8; <1.0 | | | [>0.35, >0.35] |
| Grass | 450 nm-490 nm | >0.8; <1.0 | 550 nm-590 nm | >0.8; <1.0 | 630 nm-670 nm | >0.3; <0.8 | [>0.35, >0.25] |
| Snow | 450 nm-490 nm | >0.8; <1.0 | 550 nm-590 nm | >0.8; <1.0 | 630 nm-670 nm | >0.4; <0.9 | [>0.35, >0.3] |

Additionally, various implementations of optical filters adapted to view objects on the surface of water or underwater can provide an average chroma value increase in the blue spectral range (e.g., between about 440 nm and about 490 nm) greater than about 10% (e.g., about 20%). Various implementations of optical filters adapted to view objects on grass can provide an average chroma value increase in the blue spectral range (e.g., between about 440 nm and about 490 nm) greater than about 15% (e.g., between about 20%-40%). Various implementations of optical filters adapted to view objects on snow can provide an average chroma value increase in the blue spectral range (e.g., between about 440 nm and about 490 nm) greater than about 15% (e.g., between about 20%-40%).

It is contemplated that the particular features, structures, or characteristics of any embodiments discussed herein can be combined in any suitable manner in one or more separate embodiments not expressly illustrated or described. For example, it is understood that an optical filter can include any suitable combination of light attenuation features and that a combination of light-attenuating lens elements can combine to control the chroma of an image viewed through a lens. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the optical filters disclosed herein can be used in at least some lens configurations and/or optical systems besides those explicitly disclosed herein. Any conflict that may exist between this disclosure and disclosure that is incorporated by reference should be resolved in favor of this disclosure.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims that follow.

What is claimed is:

1. Eyewear comprising:
   a lens comprising an optical filter configured to attenuate visible light in at least a first spectral band and a second spectral band, each of the first and second spectral bands comprising:
   an absorptance peak having a spectral bandwidth, a maximum absorptance, a center wavelength located at a midpoint of the spectral bandwidth, and an integrated absorptance peak area within the spectral bandwidth;
   wherein the spectral bandwidth is equal to the full width of the absorptance peak at 90% of the maximum absorptance of the absorptance peak;
   wherein the first spectral band comprises a first absorptance peak having a maximum absorptance in the wavelength range between about 440 nm and about 510 nm;
   wherein the second spectral band comprises a second absorptance peak having a second center wavelength in the wavelength range between about 550 nm and about 590 nm;
   wherein an attenuation factor of the first absorptance peak is greater than or equal to about 0.8 and less than 1;
   wherein the attenuation factor of an absorptance peak is obtained by dividing an integrated absorptance peak area within the spectral bandwidth by the spectral bandwidth of the absorptance peak; and
   wherein the lens has a CIE chromaticity x value between about 0.35 and 0.5.

2. The eyewear of claim 1, wherein the spectral bandwidth of the first absorptance peak is greater than or equal to about 5 nm and less than or equal to about 40 nm.

3. The eyewear of claim 1, wherein the spectral bandwidth of the second absorptance peak is greater than or equal to about 5 nm and less than or equal to about 40 nm.

4. The eyewear of claim 1, wherein the optical filter comprises one or more organic dyes.

5. The eyewear of claim 1, wherein the optical filter comprises one or more chroma-enhancement dyes.

6. The eyewear of claim 1, wherein the optical filter is configured to increase the average chroma value of uniform intensity light stimuli having a bandwidth of 30 nm transmitted through the lens at least partially within the first spectral band by an amount between about 5% and about 40%.

7. The eyewear of claim 1, wherein the lens has a CIE chromaticity y value greater than about 0.3.

8. The eyewear of claim 1, wherein maximum absorptance of a yellow light absorptance peak is between about 550 nm and about 590 nm.

9. The eyewear of claim 1, wherein the lens has a CIE chromaticity x value greater than 0.39.

10. The eyewear of claim 1, wherein the lens has a CIE chromaticity y value between about 0.4 and about 0.5.

11. Eyewear comprising:
a lens comprising an optical filter configured to attenuate visible light in a plurality of spectral bands, each of the plurality of spectral bands comprising an absorptance peak, wherein each of the absorptance peaks has a maximum absorptance, lower and upper edge portions that are substantially below the maximum absorptance, and a middle portion positioned between the lower and upper edge portions including the maximum absorptance and a region substantially near the maximum absorptance, wherein the optical filter comprises:
  a first absorptance peak, wherein the maximum absorptance of the first absorptance peak is between about 440 nm and about 510 nm; and
  a second absorptance peak, wherein the maximum absorptance of the second absorptance peak is between about 540 nm and about 600 nm;
wherein at least one of the lower edge portion or the upper edge portion of the first absorptance peak is between about 440 nm and about 510 nm,
wherein at least one of the lower edge portion or the upper edge portion of the second absorptance peak is between about 540 nm and about 600 nm, and
wherein the lens has a CIE chromaticity x value between about 0.35 and 0.5.

12. The eyewear of claim 11, wherein the lens comprises plastic and wherein the optical filter is at least partially incorporated in the lens.

13. The eyewear of claim 11 further comprising a coating disposed over at least one surface of the lens, wherein the optical filter is at least partially incorporated in the coating.

14. The eyewear of claim 11, wherein the first absorptance peak has a first center wavelength in the wavelength range between 450 nm and 490 nm.

15. The eyewear of claim 11, wherein the optical filter comprises a dye.

16. The eyewear of claim 11, wherein the optical filter comprises a chroma-enhancement dye.

17. The eyewear of claim 11, wherein the lens has a CIE chromaticity x value greater than 0.39.

18. The eyewear of claim 11, wherein the lens comprises plastic and wherein the optical filter is at least partially incorporated in the lens.

19. The eyewear of claim 11 further comprising a coating disposed over at least one surface of the lens, wherein the optical filter is at least partially incorporated in the coating.

20. The eyewear of claim 11, wherein the lens is adapted to increase the visibility of an object against a background of snow.

* * * * *